United States Patent
Kaburaki

(10) Patent No.: US 8,291,193 B2
(45) Date of Patent: Oct. 16, 2012

(54) ADDRESS TRANSLATION APPARATUS WHICH IS CAPABLE OF EASILY PERFORMING ADDRESS TRANSLATION AND PROCESSOR SYSTEM

(75) Inventor: Satoshi Kaburaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1037 days.

(21) Appl. No.: 12/104,963

(22) Filed: Apr. 17, 2008

(65) Prior Publication Data
US 2008/0263314 A1 Oct. 23, 2008

(30) Foreign Application Priority Data
Apr. 20, 2007 (JP) ................................. 2007-112252

(51) Int. Cl.
*G06F 12/00* (2006.01)
(52) U.S. Cl. ......................................................... 711/202
(58) Field of Classification Search .......................... None
See application file for complete search history.

(56) References Cited

FOREIGN PATENT DOCUMENTS

| JP | 60-33656 | 2/1985 |
|----|----------|--------|
| JP | 5-46462 | 2/1993 |
| JP | 2002-183106 | 6/2002 |
| JP | 2004-334698 | 11/2004 |
| WO | WO 2006/043308 A1 | 4/2006 |

*Primary Examiner* — Brian Peugh
(74) *Attorney, Agent, or Firm* — Oblon, Spivak, McClelland, Maier & Neustadt, L.L.P.

(57) ABSTRACT

An address translation apparatus includes first to third retention units, a comparison unit, and a translation unit. The first retention unit retains a multi-bit first address. The second retention unit retains a multi-bit second address different from the first address. The third retention unit retains first information indicating which bit is a translation target in the multi bits of the first address. The comparison unit compares a multi-bit third address input from outside and the first address. The translation unit translates the bit indicated by the first information in the multi bits of the third address to obtain a fourth address such that the bit indicated by the first information coincides with the second address, when the third address coincides with the first address based on comparison result of the comparison unit.

9 Claims, 18 Drawing Sheets

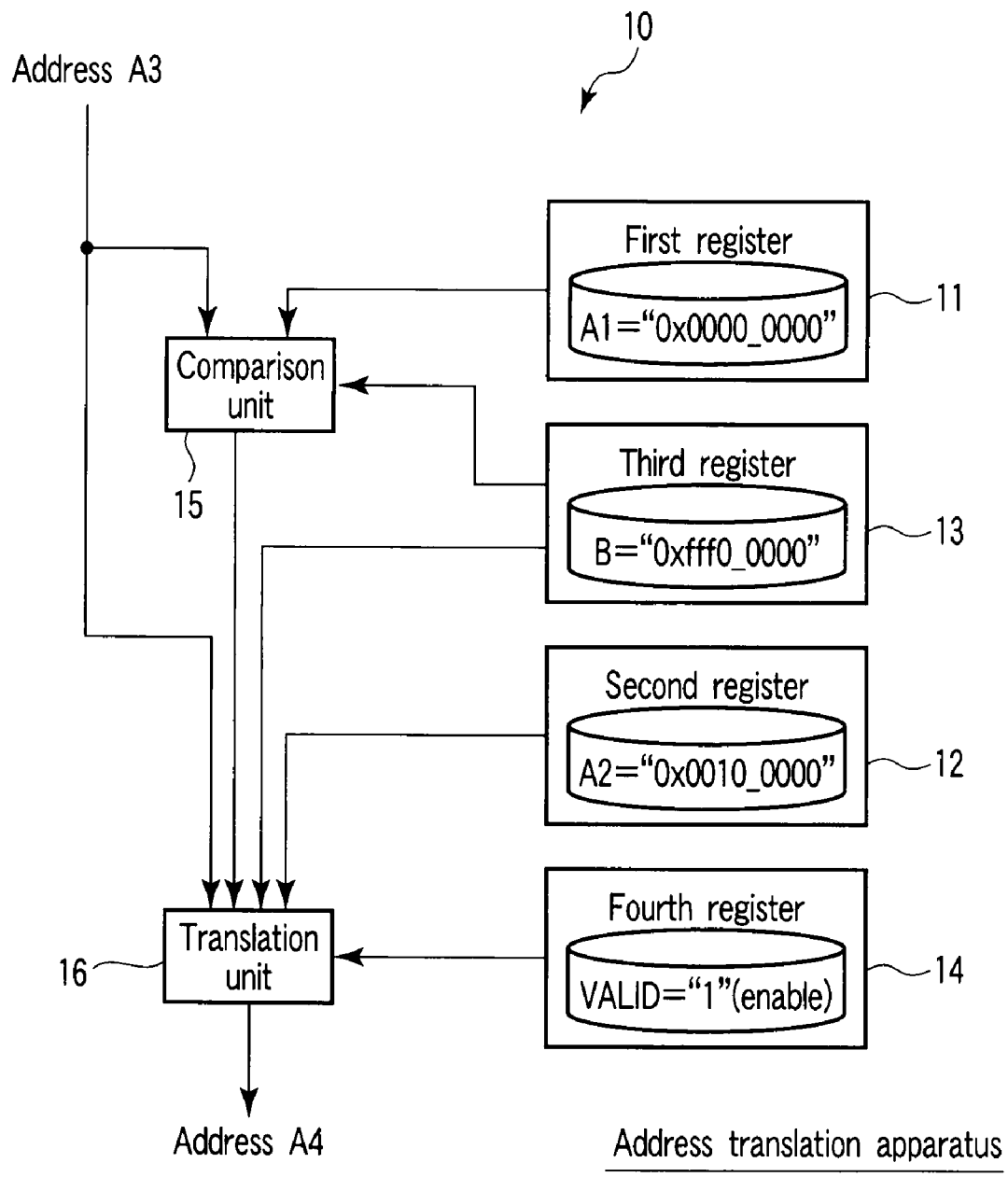
F I G. 1

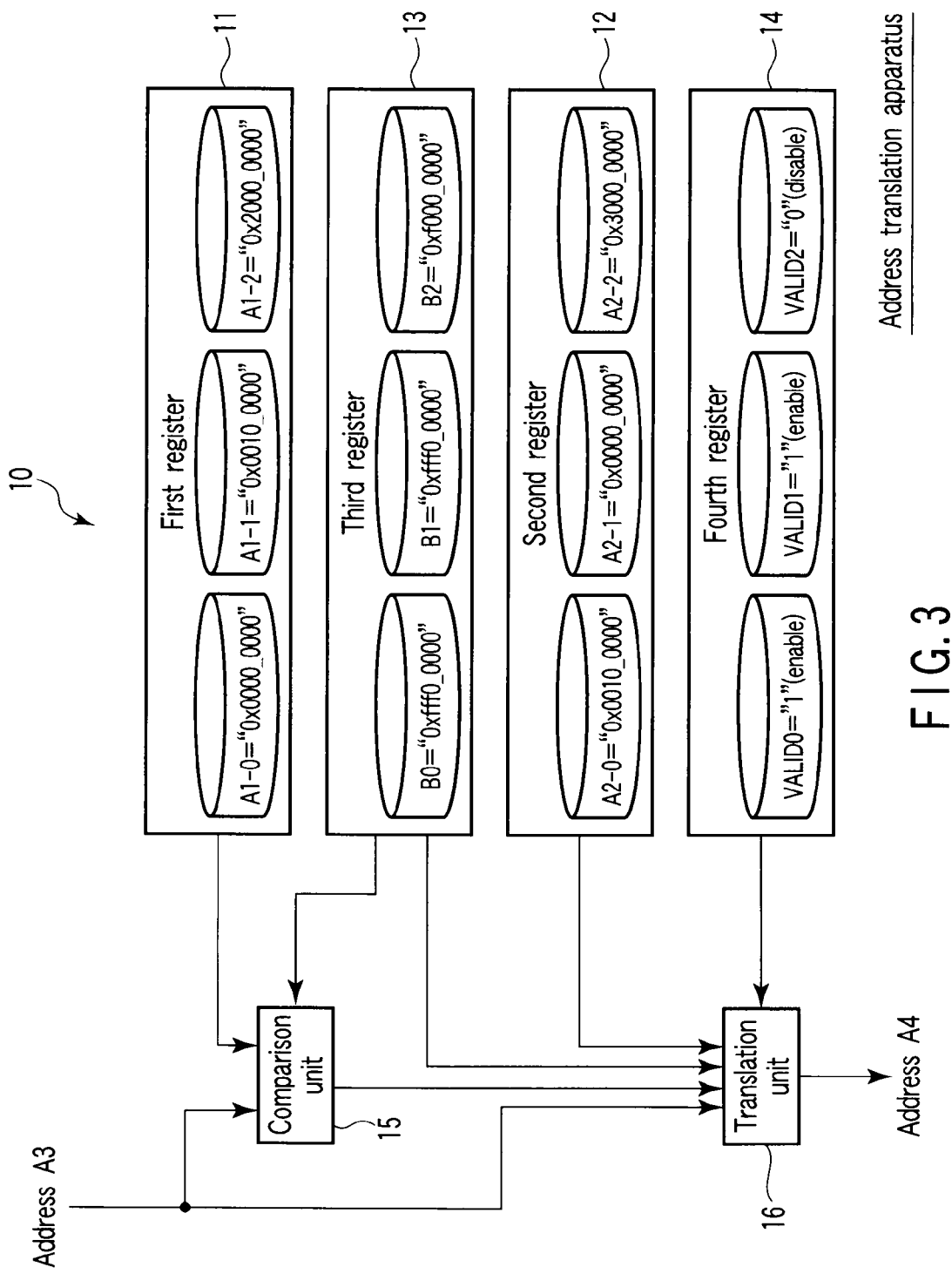
F I G. 3

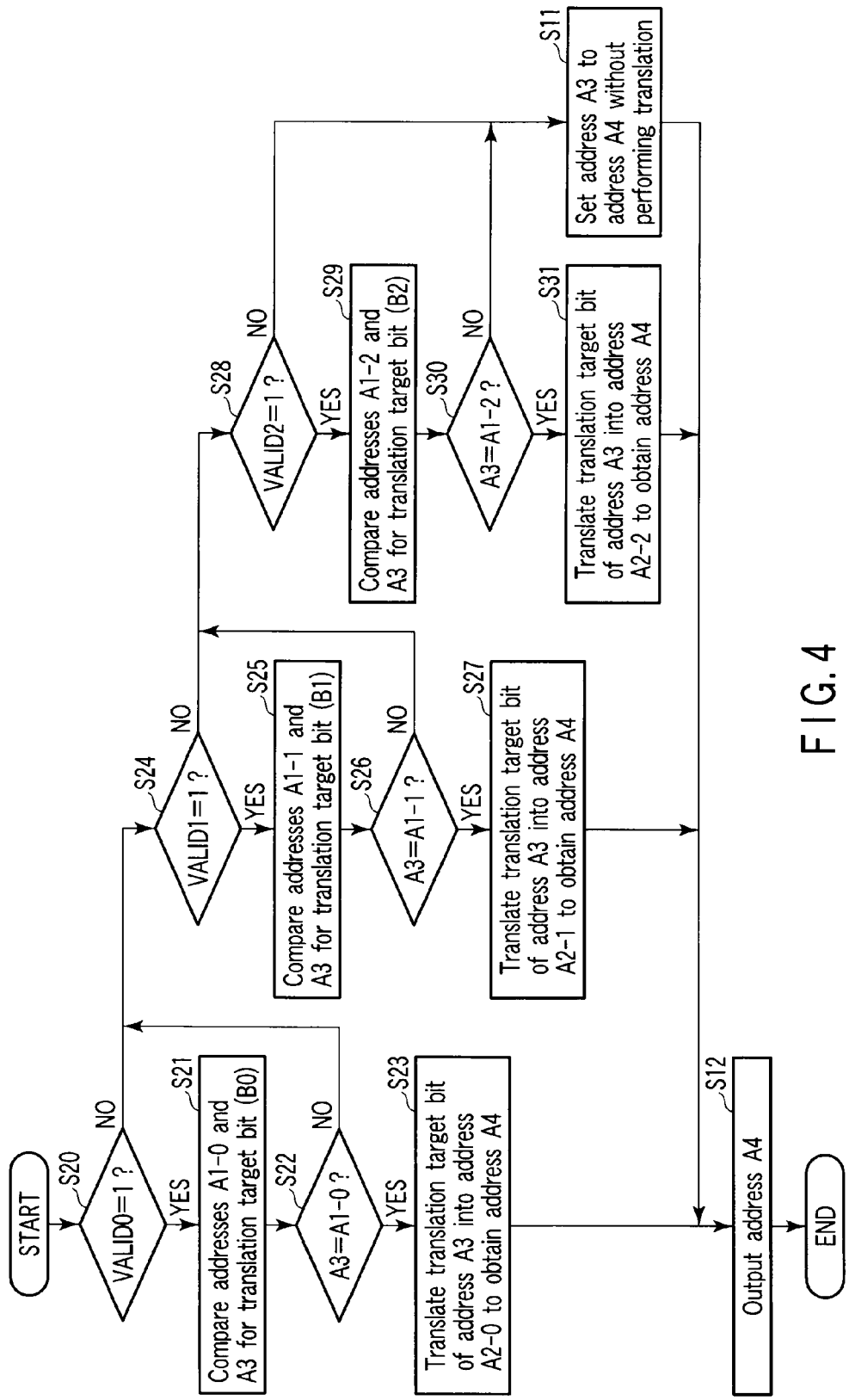
F I G. 4

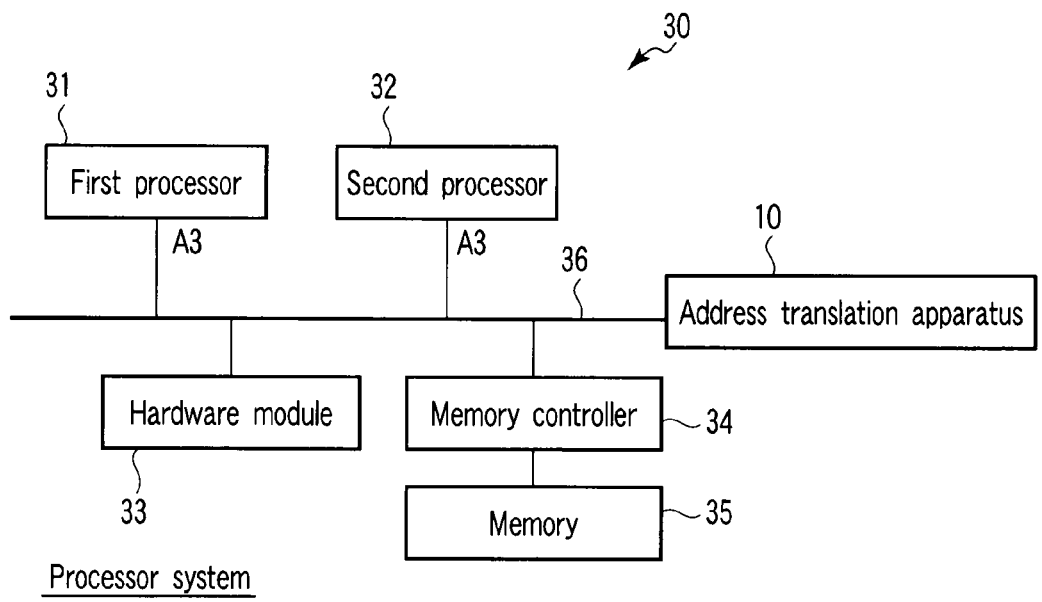
F I G. 10
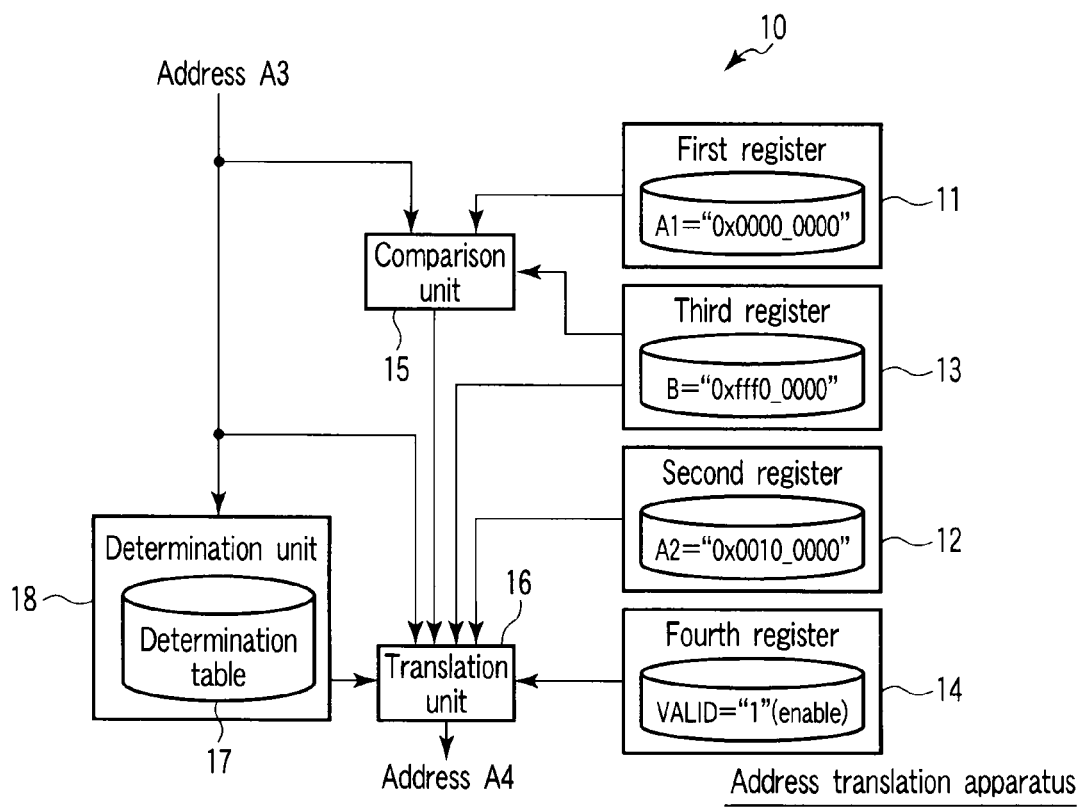
F I G. 11

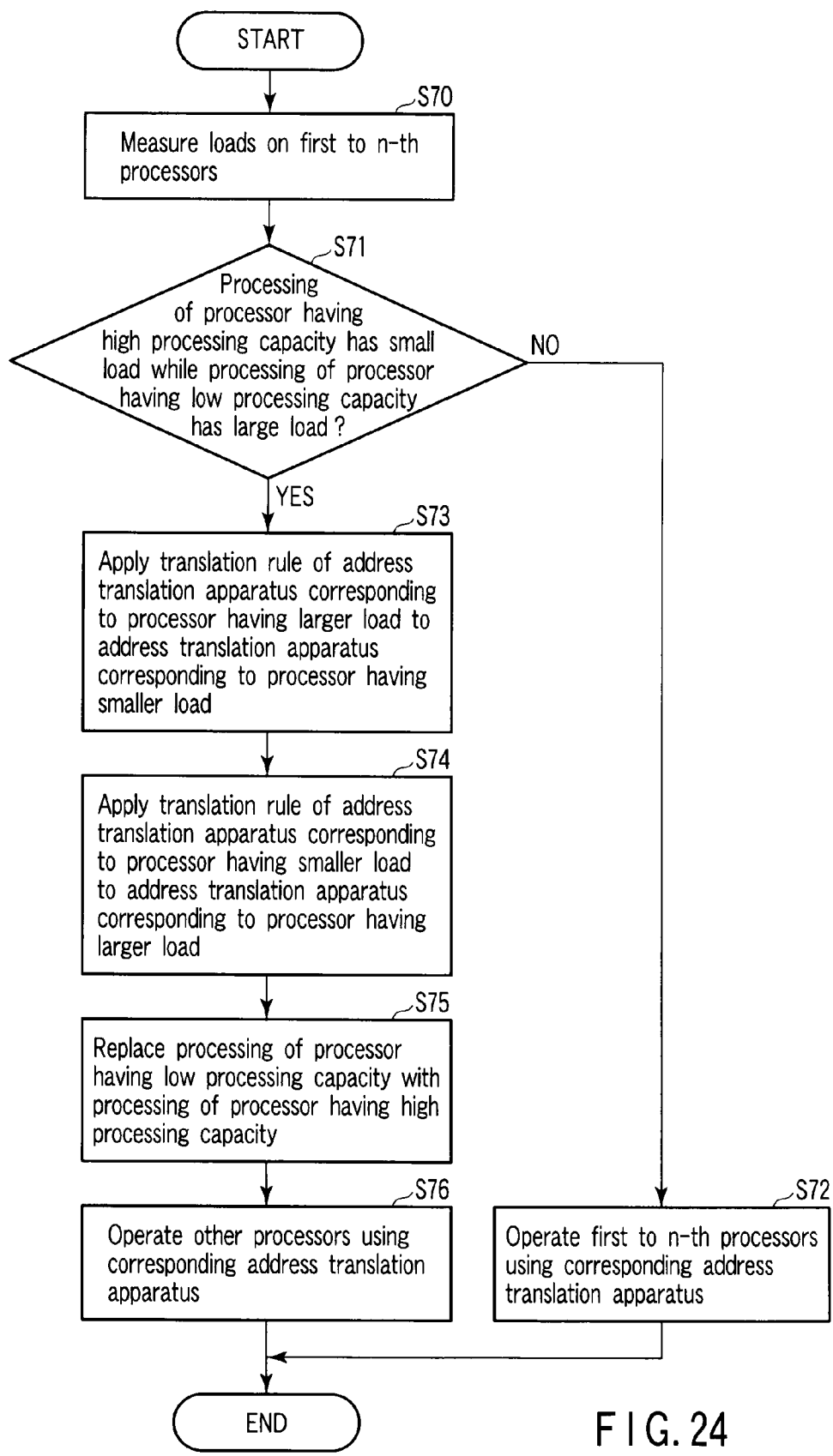
F I G. 24

ADDRESS TRANSLATION APPARATUS WHICH IS CAPABLE OF EASILY PERFORMING ADDRESS TRANSLATION AND PROCESSOR SYSTEM

CROSS-REFERENCE TO RELATED APPLICATIONS

This application is based upon and claims the benefit of priority from prior Japanese Patent Application No. 2007-112252, filed Apr. 20, 2007, the entire contents of which are incorporated herein by reference.

BACKGROUND OF THE INVENTION

1. Field of the Invention

The present invention relates to an address translation apparatus and a processor system, and particularly to an address translation method in a multiprocessor system.

2. Description of the Related Art

Conventionally, there is well known a multiprocessor system including plural processors. In the multiprocessor system, for example, plural processors refer to the same address of a memory immediately after boot. For example, Jpn. Pat. Appln. KOKAI Publication No. 60-033656 discloses a method for causing the plural processors to access different areas of the memory by translating the address in order to cause the plural processors to perform different processing.

However, in the conventional method disclosed in Jpn. Pat. Appln. KOKAI Publication No. 60-033656, a configuration for the address translation becomes complicated and the processing becomes also complicated. Accordingly, in the multiprocessor system, it is difficult to use boot code for a single processor, and the boot code is complicated.

BRIEF SUMMARY OF THE INVENTION

An address translation apparatus according to an aspect of the present invention includes:
a first retention unit which retains a multi-bit first address;
a second retention unit which retains a multi-bit second address different from the first address;
a third retention unit which retains first information indicating which bit is a translation target in the multi bits of the first address;
a comparison unit which compares a multi-bit third address input from outside and the first address; and
a translation unit which translates the bit indicated by the first information in the multi bits of the third address to obtain a fourth address such that the bit indicated by the first information coincides with the second address, when the third address coincides with the first address based on comparison result of the comparison unit.

A processor system according to an aspect of the present invention includes:
a memory device configured to retain data;
a first processor and a second processor which generate the third address when accessing the memory device;
a data bus which connects the memory device, the first processor, and the second processor; and
an address translation apparatus, recited above, which is provided in the data bus or connected to the data bus, the address translation apparatus further including a determination unit which causes the translation unit to translate the third address when the third address is given from the second processor, and causes the translation unit not to translate the third address when the third address is given from the first processor, the memory device retaining a first program executed by the first processor in an area corresponding to the third address, the memory device retaining a second program executed by the second processor in an area corresponding to the fourth address.

BRIEF DESCRIPTION OF THE SEVERAL VIEWS OF THE DRAWING

FIG. 1 is a block diagram showing an address translation apparatus according to a first embodiment of the invention;

FIG. 3 is a block diagram showing an address translation apparatus according to a second embodiment of the invention;

FIG. 4 is a flowchart showing a processing flow of the address translation apparatus according to the second embodiment of the invention;

FIG. 10 is a block diagram showing a processor system according to a fourth embodiment of the invention;

FIG. 11 is a conceptual view showing a memory space in a memory included in the processor system according to the fourth embodiment of the invention;

FIG. 24 is a flowchart showing a processing flow of a processor system according to a seventh embodiment of the invention.

DETAILED DESCRIPTION OF THE INVENTION

[First Embodiment]

Figure 2:
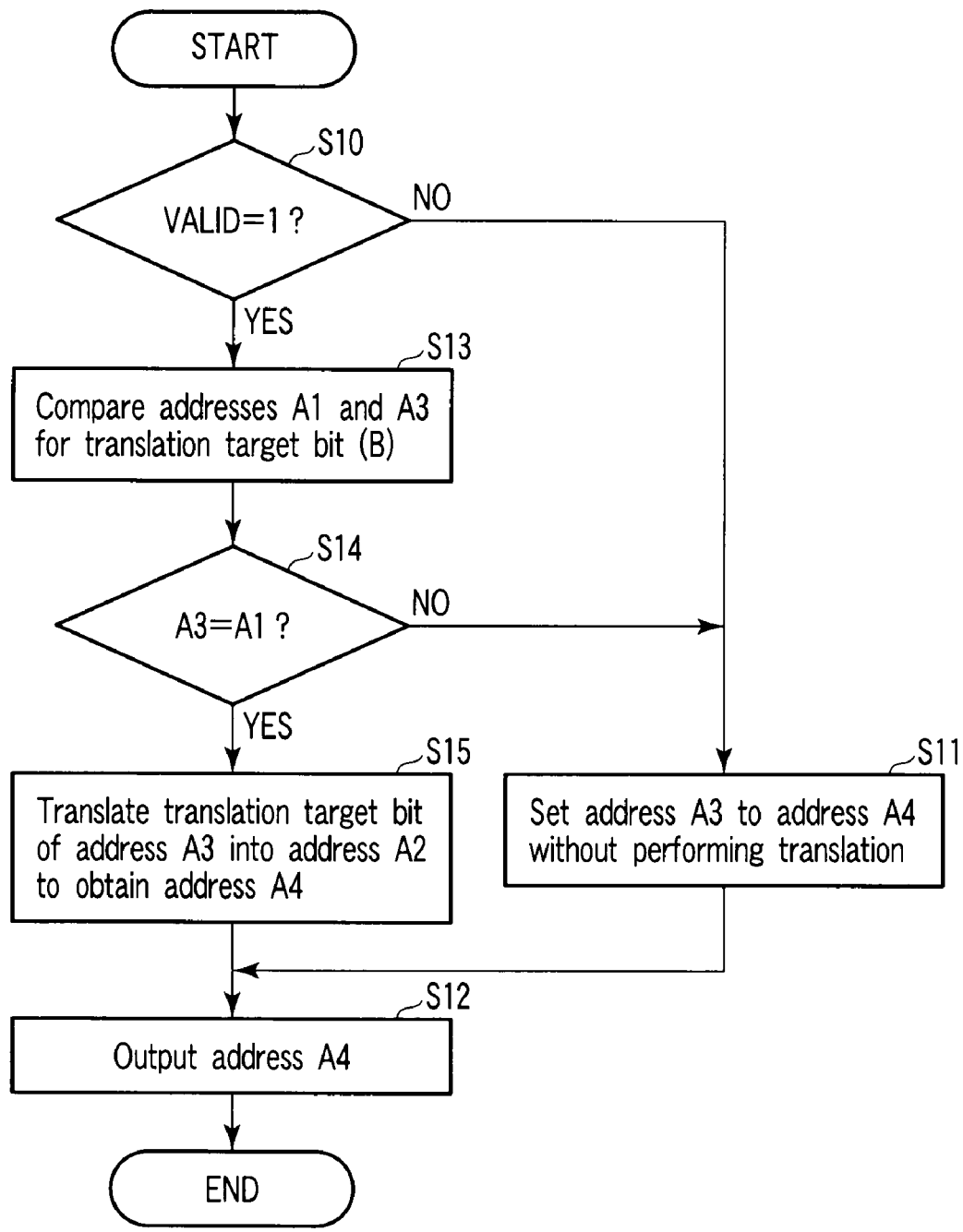
FIG. 2 is a flowchart showing a processing flow of the address translation apparatus according to the first embodiment of the invention.

An address translation apparatus according to a first embodiment of the invention will be described with reference to FIG. 1. FIG. 1 is a block diagram showing the address translation apparatus of the first embodiment.

As shown in FIG. 1, an address translation apparatus 10 includes first to fourth registers 11 to 14, a comparison unit 15, and a translation unit 16.

The first register 11 retains a first address A1. The first address A1 is hexadecimal 8-digit address information, and is information on the address to be translated. That is, the first address A1 is binary 32-digit address information. In the following description, "0x" appended to a head of the address indicates that the address is represented by a hexadecimal number. For example, the first address A1 is indicated by "0x0000_0000".

The second register 12 retains a second address A2. The second address A2 is hexadecimal 8-digit address information, and is information on the address after translation. That is, the second address A2 is binary 32-digit address information. The address to be translated is translated according to the second address A2. For example, the second address A2 is indicated by "0x0010_0000".

The third register 13 retains target bit information B indicating a bit that becomes a translation target. The target bit information B is hexadecimal 8-digit data. That is, the target bit information B is binary 32-digit address information. In the hexadecimal 8-digit, i.e., binary 32-digit data, the bit indicated by "1" is one which becomes the translation target. For example, the target bit information B is indicated by "0xfff0_0000". Accordingly, in the first embodiment, the upper 12 bits in binary number become the translation target. For example, in the case of B="0xffe0_0000", the upper 11 bits in binary number become the translation target.

The fourth register 14 retains a flag VALID indicating whether or not the address translation is enabled. When the flag VALID is "1", the address translation is enabled to perform the address translation. When the flag VALID is "0", the address translation is disabled and the address translation is not performed.

The comparison unit 15 compares an input address A3 input from the outside and the first address A1 retained by the first register 11, and outputs the comparison result to the translation unit 16. At this point, the comparison unit 15 reads the target bit information B from the third register 13, and compares the input address A3 and the first address A1 only for the bit which becomes the translation target specified by the target bit information B. For example, as can be seen from FIG. 1, the bit which becomes the translation target specified by the target bit information B is the upper 12 bits in the case of the binary number representation (upper 3 digits in the case of the hexadecimal number representation). Accordingly, the comparison unit 15 compares the upper 12 bits of the input address A3 and the upper 12 bits of the first address A1.

The translation unit 16 translates the input address A3 to obtain an address A4 according to the second address A2 retained by the second register 12, when the flag VALID is "1" in the fourth register 14 while the coincident comparison result is obtained in the comparison unit 15. The address translation is performed by replacing the bit specified by the target bit information B in the input address A3 with the second address A2. For example, in the example of FIG. 1, the upper 12 bits of the input address A3 are replaced with the upper 12 bits ("0x001"="0b000000000001") of the second address A2. "0b" appended to the head of the address indicates that the address is represented by a binary number.

Operation of the address translation apparatus 10 will be described below with reference to FIG. 2. FIG. 2 is a flowchart showing a flow of the operation performed by the address translation apparatus 10. The case in which the input address A3 is "0x0000_0000" will be described by way of example.

When the address A3 is input, the translation unit 16 confirms the flag VALID in the fourth register 14. In the case of VALID="0" (NO in Step S10), the translation unit 16 directly passes the address A3 (Step S11), and directly outputs the address A3 as the address A4 (Step S12).

In the case of VALID="1" (YES in Step S10), the comparison unit 15 compares the input address A3 and the first address A1 for the bit specified by the target bit information B retained in the third register 13 (Step S13). The upper 12 bits are specified by the target bit information B. Accordingly, the comparison unit 15 compares the upper 12 bits ("0x000") of the input address A3 and the upper 12 bits ("0x000") of the first address A1. For example, the processing for determining whether or not all the bits specified by the target bit information B of the input address A3 and first address A1 are equal to each other can be performed by the following expression:

((Input address A3) xor (first address A1)) and (target bit information B).

In the expression, "xor" indicates an exclusive OR operation in each bit, and "and" indicates an AND operation in each bit. When the expression becomes "0", all the bits of the input address A3 and first address A1 are equal to each other.

When the input address A3 and the first address A1 are not equal to each other (NO in Step S14), the flow passes to Step S11. That is, the translation unit 16 directly outputs the input address A3 as the address A4 without performing the address translation (Step S12).

When the input address A3 and the first address A1 are equal to each other (YES in Step S14), the flow passes to Step S15. In the first embodiment, "0x000" is the upper 12 bits of the input address A3 and "0x000" is the upper 12 bits of the first address A1, and therefore the flow passes to Step S15.

In Step S15, the translation unit 16 translates the translation target bit of the input address A3 into the second address A2 to obtain the address A4. In the first embodiment, the translation unit 16 recognizes that the bit to be translated is the upper 12 bits from the target bit information B retained in the third register 13. The translation unit 16 replaces the upper 12 bits ("0x000") of the input address A3 with the upper 12 bits ("0x001") of the second address A2. Accordingly, the input address A3="0x0000_0000" is translated into the address A4="0x0010_0000". That is, generally the input address A3="0x000X_XXXX" ("X" is an arbitrary hexadecimal number) is translated into the address A4="0x001X_XXXX". The translation unit 16 outputs the address A4 obtained by the translation (Step S12).

The address translation apparatus having the above-described configuration obtains the following effect (1).

(1) The address can be translated by the simple technique.

In the configuration of the first embodiment, the information (first address A1) on the address to be translated, the information (second address A2) on the address after the translation, and the information (target bit information B) indicating the bit to be translated are stored in the registers. When the first address A1 coincides with the input address A3, the bit corresponding to the target bit information B in the input address A3 is translated into the second address A2. Accordingly, the address translation can be performed by the simple technique and the configuration of the address translation apparatus 10 can also be simplified.

In the first embodiment, the registers 11 to 14 are provided to retain the first address A1, second address A2, target bit information B, and flag VALID, respectively. Alternatively, the information A1, A2, B, and VALID may be retained in one register.

The information A1, A2, B, and VALID may be statically fixed values, or may be values which can be dynamically changed using a control register. Additionally, part of the information may be omitted. For example, when the translation is not required for lower several bits of the address, the lower several bits may be omitted in the first address A1, second address A2, and target bit information B. More specifically, in the configuration of FIG. 1, when the translation is not performed for lower 16 bits of the input address A3, the first address A1="0x0000", second address A2="0x0010", and target bit information B="0xfff0" may be obtained. Moreover, the flag VALID is not required when the address translation is always enabled. The bit in which the translation is not required is not always limited to the lower several bits. That is, when the translation is not required for at least one of the bits of the address, the corresponding bit can be omitted in the first address A1, second address A2, and target bit information B.

[Second Embodiment]

An address translation apparatus according to a second embodiment of the invention will be described below. Plural first addresses A1, second addresses A2, pieces of target bit information B, and flags VALID of the first embodiment are provided in the second embodiment. FIG. 3 is a block diagram showing the address translation apparatus according to the second embodiment.

As shown in FIG. 3, in the address translation apparatus 10 according to the second embodiment, the first register 11 retains three first addresses A1-0, A1-1, and A1-2, and the second register 12 retains three second addresses A2-0, A2-1, and A2-2. The third register 13 retains three pieces of target bit information B0, B1, and B2, and the fourth register 14 retains three flags VALID0, VALID1, and VALID2.

The first addresses A1-0="0x0000_0000", A1-1="0x0010_0000", and A1-1="0x2000_0000", the second addresses A2-0="0x0010_0000", A2-1="0x0000_0000", and A2-2="0x3000_0000", the pieces of target bit information B0="0xfff0_0000", B1="0xfff0000", and B2="0xf000_0000", and the flags VALID0="1", VALID1="1", and VALID2="0" are retained by way of example.

Other configurations are similar to those of the first embodiment. Different registers may be provided for each of the 12 pieces of information on the addresses A1-0 to A1-2, A2-0 to A2-2, and B0 to B2 and the VALID0 to VALID2.

An operation of the address translation apparatus 10 will be described below with reference to FIG. 4. FIG. 4 is a flowchart showing a flow of the operation performed by the address translation apparatus 10.

When the address A3 is input, the translation unit 16 confirms the flag VALID0 in the fourth register 14. In the case of VALID0="1" (YES in Step S20), the comparison unit 15 compares the input address A3 and the first address A1-0 for the bit specified by the target bit information B0 retained in the third register 13 (Step S21). The upper 12 bits are specified by the target bit information B0. Accordingly, the comparison unit 15 compares the upper 12 bits of the input address A3 and the upper 12 bits ("0x000") of the first address A1-0. The processing in Step S21 is similar to that in Step S13 of the first embodiment. Accordingly, whether or not all the bits of the input address A3 and first address A1-0 are equal to each other can be known by performing the processing of the following expression:

((Input address A3) xor (first address A1-0)) and (target bit information B0).

When the input address A3 and the first address A1-0 are equal to each other (YES in Step S22), the flow passes to Step S23.

The processing in Step S23 is similar to that in Step S15 of the first embodiment. That is, the translation unit 16 translates the translation target bit of the input address A3 into the second address A2-0 to obtain the address A4. More specifically, the translation unit 16 recognizes that the bit to be translated is the upper 12 bits from the target bit information B0 retained in the third register 13. The translation unit 16 replaces the upper 12 bits of the input address A3 with the upper 12 bits ("0x001") of the second address A2-0. Accordingly, the input address A3="0x000X_XXXX" ("X" is an arbitrary hexadecimal number) is translated into the address A4="0x001X_XXXX" (Step S23). The translation unit 16 outputs the address A4 obtained by the translation (Step S12).

In the case of VALID0="0" in Step S20 (NO in Step S20), or in the case where the input address A3 is not equal to the first address A1-0 in Step S21 (NO in Step S22), the flow passes to Step S24.

In Step S24, the translation unit 16 confirms the flag VALID1 in the fourth register 14. In the case of VALID1="1" (YES in Step S24), the comparison unit 15 compares the input address A3 and the first address A1-1 for the bit specified by the target bit information B1 retained in the third register 13 (Step S25). The upper 12 bits are specified by the target bit information B1. Accordingly, the comparison unit 15 compares the upper 12 bits of the input address A3 and the upper 12 bits ("0x001") of the first address A1-1. The processing in Step S21 is similar to that in Step S13 of the first embodiment. Whether or not all the bits of the input address A3 and first address A1-1 are equal to each other can be known by performing the processing of the following expression:

((Input address A3) xor (first address A1-1)) and (target bit information B1).

When the input address A3 and the first address A1-1 are equal to each other (YES in Step S26), the flow passes to Step S27.

The processing in Step S27 is similar to that in Step S15 of the first embodiment. That is, the translation unit 16 translates the translation target bit of the input address A3 into the second address A2-1 to obtain the address A4. More specifically, the translation unit 16 recognizes that the bit to be translated is the upper 12 bits from the target bit information B1 retained in the third register 13. The translation unit 16 replaces the upper 12 bits of the input address A3 with the upper 12 bits of "0x000" of the second address A2-1. Accordingly, the input address A3="0x001X_XXXX" ("X" is an arbitrary hexadecimal number) is translated into the address A4="0x000X_XXXX" (Step S27). The translation unit 16 outputs the address A4 obtained by the translation (Step S12).

In the case of VALID1="0" in Step S24 (NO in Step S24), or in the case where the input address A3 is not equal to the first address A1-1 in Step S25 (NO in Step S26), the flow passes to Step S28.

In Step S28, the translation unit 16 confirms the flag VALID2 in the fourth register 14. In the case of VALID2="1" (YES in Step S28), the comparison unit 15 compares the input address A3 and the first address A1-2 for the bit specified by the target bit information B2 retained in the third register 13 (Step S29). The upper 4 bits are specified by the target bit information B2. Accordingly, the comparison unit 15 compares the upper 4 bits of the input address A3 and the upper 4 bits ("0x2"="0b0010") of the first address A1-2. The processing in Step S29 is also similar to that in Step S13 of the first embodiment. Whether or not all the bits of the input address A3 and first address A1-2 are equal to each other can be known by performing the processing of the following expression:

((Input address A3) xor (first address A1-2)) and (target bit information B2).

When the input address A3 and the first address A1-2 are equal to each other (YES in Step S30), the flow passes to Step S31.

The processing in Step S31 is similar to that in Step S15 of the first embodiment. That is, the translation unit 16 translates the translation target bit of the input address A3 into the second address A2-2 to obtain the address A4. More specifically, the translation unit 16 recognizes that the bit to be translated is the upper 4 bits from the target bit information B2 retained in the third register 13. The translation unit 16 replaces the upper 4 bits of the input address A3 with the upper 4 bits ("0x3") of the second address A2-2. Accordingly, the input address A3="0x2XXX_XXXX" ("X" is an arbitrary hexadecimal number) is translated into the address A4="0x3XXX_XXXX" (Step S31). The translation unit 16 outputs the address A4 obtained by the translation (Step S12).

The address translation apparatus having the above-described configuration obtains the following effect (2) in addition to the effect (1) of the first embodiment.

(2) The address translation can be performed for the plural memory spaces.

In the configuration of the second embodiment, the address translation apparatus 10 retains the plural first addresses A1, second addresses A2, pieces of target bit information B, and flags VALID. The address translation apparatus 10 sequentially performs the comparison processing of the flag VALID, the comparison processing of the input address A3 and the first address A1, and the translation processing of the input address A3 depending on the comparison result for the plural pieces of information A1, A2, B, and VALID. Accordingly, the addresses of the plural memory spaces can be translated by the translation rules that are different from one another, and a degree of freedom can be enhanced for the use of the memory.

Figure 5:
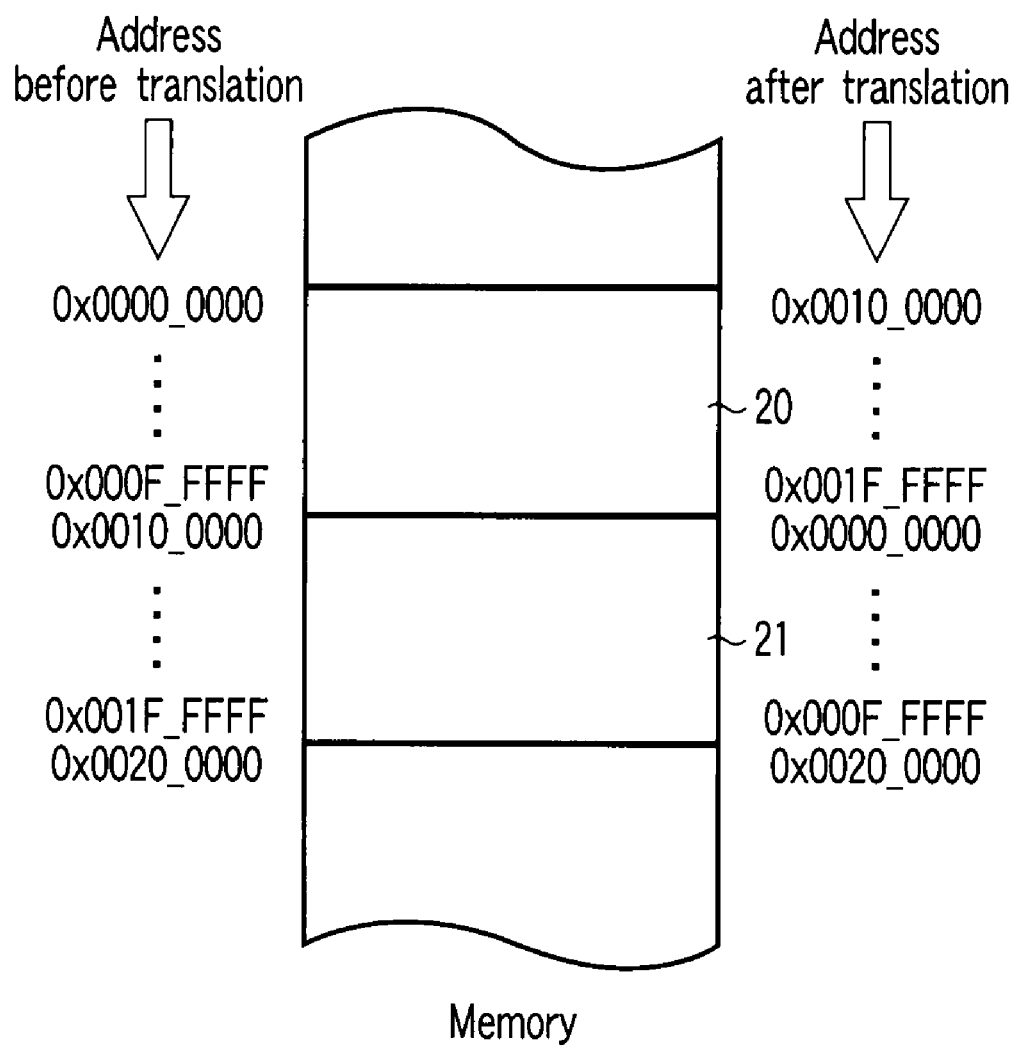
FIG. 5 is a conceptual view showing a memory space.

Referring to FIG. 5, the case in which a particular memory space is replaced will be described by way of example. FIG. 5 is a conceptual view showing the memory space. In the case of the configuration shown in FIG. 3, the input address A3="0x000X_XXXX" is translated into the address A4="0x001X_XXXX" from the first address A1-0, second address B1-0, and target bit information B0. The input address A3="0x001X_XXXX" is translated into the address A4="0x000X_XXXX" from the first address A1-1, second address B1-1, and target bit information B1.

Accordingly, in the case where the input addresses A3="0x0000_0000" to "0x000F_FFFF" are given as shown in FIG. 5, the actually-accessed memory space is an area 21 whose addresses are "0x0010_0000" to "0x001F_FFFF". On the other hand, in the case where the input addresses A3="0x0010_0000" to "0x001F_FFFF" are given, the actually-accessed memory space is an area 20 whose addresses are "0x0000_0000" to "0x000F_FFFF". Thus, the area 20 and the area 21 can be replaced with each other in the memory space using the address translation apparatus of the second embodiment.

In the case where the plural address translation rules are provided as in the second embodiment, the address obtained by the address translation based on a certain translation rule possibly coincides with another translation rule. In such cases, in order to prevent the address translation from being performed plural times, it is not necessary to perform the address translation based on the translation rule with which the translated address coincides. Obviously, the address translation may be performed based on the translation rule with which the translated address coincides.

[Third Embodiment]

Figure 6:
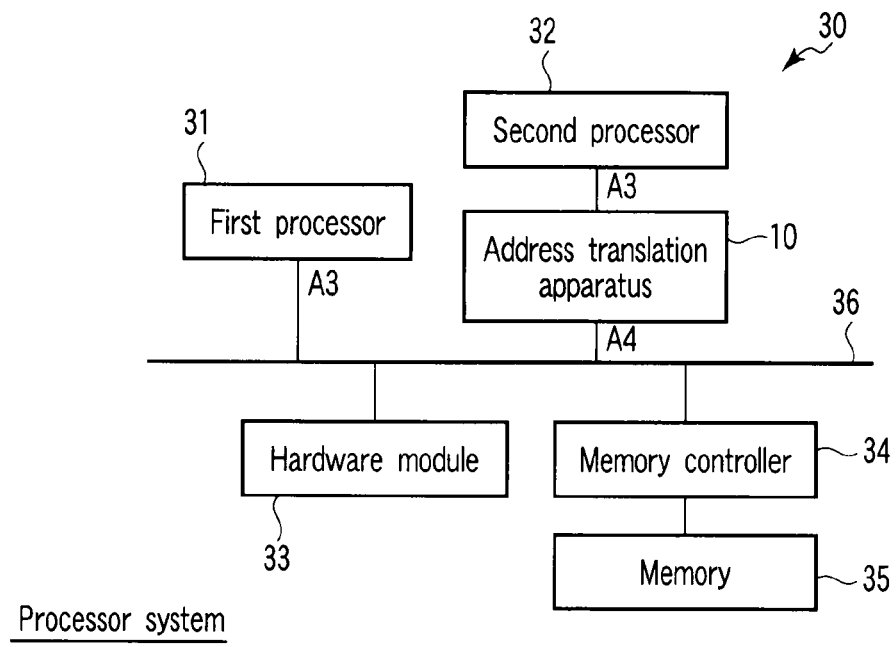
FIG. 6 is a block diagram showing a processor system according to a third embodiment of the invention.

A processor system according to a third embodiment of the invention will be described below. The third embodiment relates to the processor system including the address translation apparatus 10 described in the first and second embodiments and the plural processors. FIG. 6 is a block diagram showing the processor system according to the third embodiment.

As shown in FIG. 6, a processor system 30 includes a first processor 31, a second processor 32, a hardware module 33, a memory controller 34, a memory 35, a bus 36, and the address translation apparatus 10 described in the first or second embodiments.

The first processor 31 and the second processor 32 concurrently perform the processing using software retained in the memory 35. The first processor 31 and the second processor 32 generate the address A3 to access the memory 35.

The address translation apparatus 10 is connected to the bus 36, and is provided while correlated with the second processor 32. The address translation apparatus 10 translates the address A3 generated by the second processor 32 into the address A4 by the method described in the first and second embodiments.

The memory controller 34 accesses the memory 35 based on the address A3 given from the first processor 31. The memory controller 34 accesses the memory 35 based on the address A4 given from the address translation apparatus 10.

The hardware module 33 is controlled by the first processor 31 or the second processor 32.

The bus 36 connects the first processor 31, address translation apparatus 10, hardware module 33, and memory controller 34 to one another. The bus 36 may connect these circuit blocks while the communication can be conducted, the bus 36 may prohibit a part of the circuit blocks to conduct the communication, or the bus 36 may permit the circuit blocks to conduct only unidirectional communication.

Figure 7:
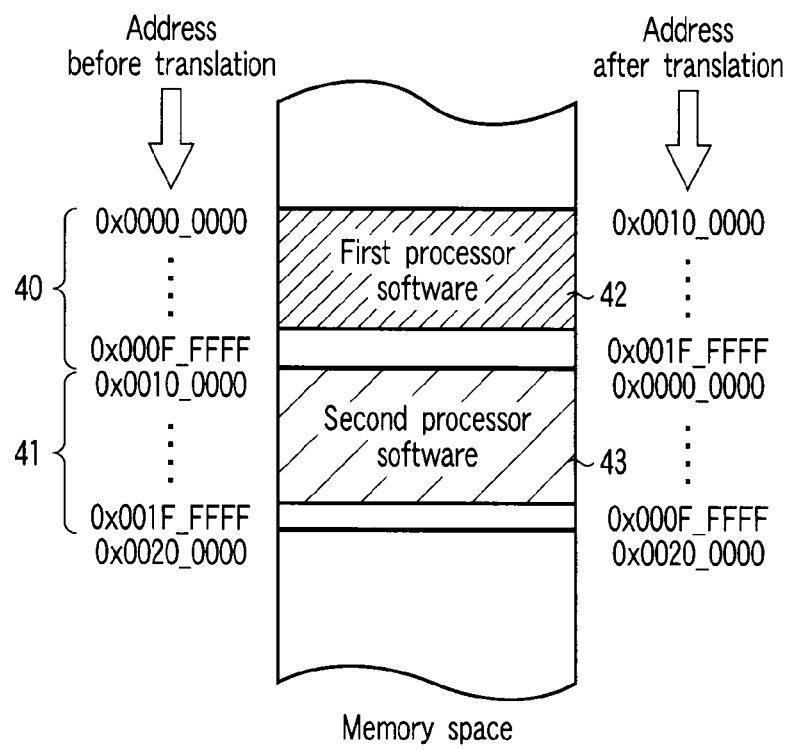
FIGS. 7 to 9 are conceptual views showing a memory space in a memory included in the processor system according to the third embodiment of the invention.

The memory 35 is formed by a semiconductor memory such as DRAM (SDRAM, DDR-SDRAM, DDR2-SDRAM, and RDRAM [registered trademark]), SRAM and a flash memory or a hard disk. The memory 35 retains the software to operate the first processor 31 and the second processor 32. FIG. 7 is a conceptual view partially showing the memory space in the memory 35.

As shown in FIG. 7, an area whose address ranges from "0x0000_0000" to "0x000F_FFFF" in the memory space is referred to as area 40, and an area whose address ranges from "0x0010_000" to "0x001F_FFFF" is referred to as area 41. A first processor software 42 is retained in the area 40, and a second processor software 43 is retained in the area 41.

When the first processor 31 generates A3="0x0000_0000" to access the memory 35, the memory controller 34 reads the first processor software 42 from the address "0x0000_0000" of the memory 35, whereby the first processor 31 executes the first processor software 42.

On the other hand, when the second processor 32 generates A3="0x0000_0000", the address translation apparatus 10 translates the address A3 into the address A4="0x0010_0000". Accordingly, the memory controller 34 reads the second processor program 43 from the area 41 of the memory space, whereby the second processor 32 executes the second processor software 43. The address translation method performed by the address translation apparatus 10 is similar to that of the first or second embodiment.

The processor system of the third embodiment obtains the following effect (3) in addition to the effects (1) and (2) of the first and second embodiments.

(3) The single processor software can be used in the multiprocessor system.

In the configuration of the third embodiment, the address translation apparatus 10 described in the first or second embodiment is applied to the one processor (second processor 32) in the multiprocessor system. Accordingly, even if the plural processors generate the same address to access the memory, the processors can access the memory areas that are different from each other.

Usually the plural processors access the same address in the memory when the boot program is executed. For example, in FIG. 7, the first and second processors 31 and 32 access the address "0x0000_0000" in the memory 35. At this point, when the first and second processors 31 and 32 are caused to perform different processing, a branch instruction for causing each processor to perform different processing is required for the program stored in the address "0x0000_0000" of the memory 35. That is, it is necessary to produce a program such that the processing is branched by a processor ID, and it is difficult to use a single processor program in which a single-processor system is assumed. Accordingly, a complicated program is newly required.

However, in the configuration of the third embodiment, even if the first and second processors 31 and 32 generate the same address A3, the address translation apparatus 10 translates the address A3 of the second processor 32 into the address A4. In the memory 35, the second processor software 43 is placed in the area corresponding to the address A4 obtained by the translation. Accordingly, the branch instruction is not required in the program, and the first and second processors 31 and 32 can be caused to perform the different processing by placing the conventional single processor software in the areas 40 and 41.

Figure 8:
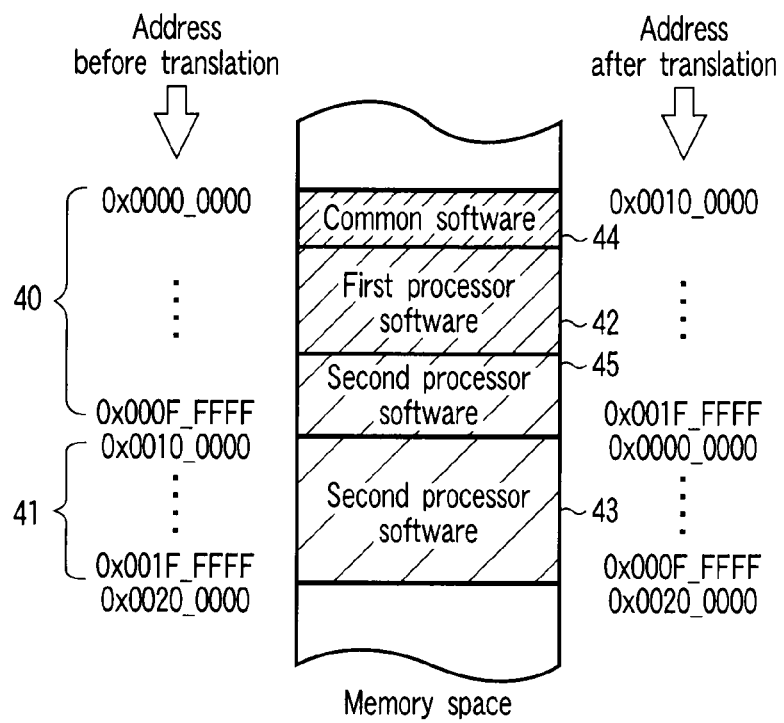

In FIG. 7, the first processor software 42 is placed in the area 40, and the second processor program 43 is placed in the area 41. Alternatively, the program shared by the first and second processors 31 and 32 may be placed in one of the areas 40 and 41. The example will be described with reference to FIG. 8. FIG. 8 is a conceptual view showing the memory space.

Figure 9:
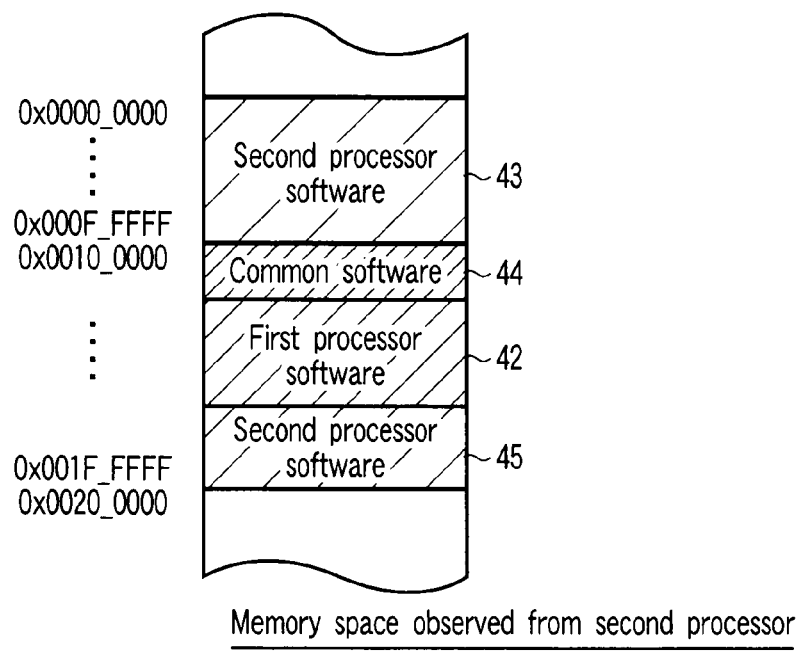

As shown in FIG. 8, a common software 44 shared by the first and second processors 31 and 32 and a second processor software 45 are placed in the area 40 of the memory 35 in addition to the first processor software 42. Even in the case, the second processor 32 can access the software 44 and 45 using the address A4 obtained by the address translation apparatus 10. Obviously, even in the case, it is not necessary to identify the processor ID to branch the processing in software. FIG. 9 shows a state of the memory space of the memory 35 when observed from the second processor 32. As shown in FIG. 9, it is observed by the second processor 32 that the software 43 is retained in the area whose addresses are "0x0000_0000" to "0x000F_FFFF" while the software 42 and 44, and 45 are retained in the area whose addresses are "0x0010_0000" to "0x001F_FFFF".

[Fourth Embodiment]

A processor system according to a fourth embodiment of the invention will be described. In the fourth embodiment, the address translation apparatus 10 of the third embodiment is provided in the bus 36. FIG. 10 is a block diagram showing the processor system according to the fourth embodiment.

As shown in FIG. 10, in the processor system 30 of the fourth embodiment, the second processor 32 is connected to the bus 36, and the address translation apparatus 10 is provided in the bus 36. The address translation apparatus 10 performs the address translation to the address A3 generated by the first processor and the address A3 generated by the second processor 32. The memory controller 34 accesses the memory 35 based on the address A4 obtained by the address translation apparatus 10.

FIG. 11 is a block diagram showing the address translation apparatus 10. As shown in FIG. 11, the address translation apparatus 10 according to the fourth embodiment includes a determination unit 17 in addition to the configuration shown in FIG. 1 of the first embodiment. The determination unit 17 retains a determination table 18. The determination table 18 retains information indicating whether or not the address translation is performed in each of the first and second processors 31 and 32. The determination unit 17 determines whether or not the input address A3 should be translated based on the determination table 18. The translation unit 16 performs the address translation based on the flag VALID, when the determination unit 17 determines that the input address A3 should be translated.

Figure 12:
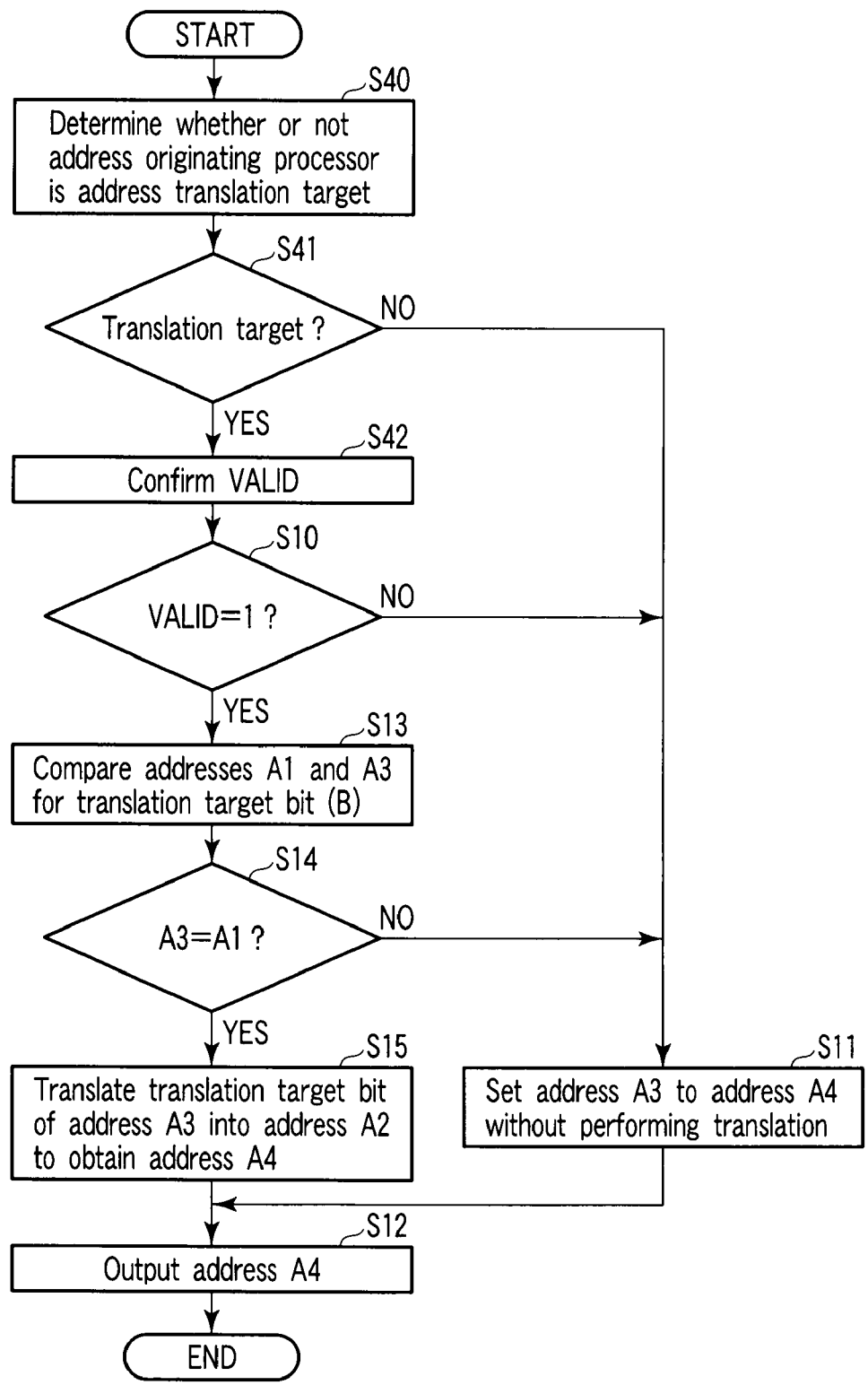
FIG. 12 is a flowchart showing a processing flow of the processor system according to the fourth embodiment of the invention.

An operation of the processor system 30 of the fourth embodiment will be described below with reference to FIG. 12. FIG. 12 is a flowchart showing a flow of the operation performed by the processor system of the fourth embodiment.

As shown in FIG. 12, when one of the first and second processors 31 and 32 inputs the address A3 to the address translation apparatus 10, the determination unit 17 refers to the determination table 18. The determination unit 17 determines whether or not the processor generating the address A3 is the address translation target (Step S40). When the determination unit 17 determines that the processor generating the address A3 is not the address translation target (NO in Step S41), the translation unit 16 does not perform the address translation, the translation unit 16 directly passes the input address A3 (Step S11), and the translation unit 16 outputs the input address A3 as the address A4 to the memory controller 34 (Step S12). When the determination unit 17 determines that the processor generating the address A3 is the address translation target (YES in Step S41), the translation unit 16 confirms the flag VALID (Step S42), and the flow passes to Step S10 as in the first embodiment.

In the configuration of the fourth embodiment, the following effect (4) is obtained in addition to the effects (1) to (3) of the first to third embodiments. (4) In the processor system including many processors, the effect (3) is obtained while the enlargement of the chip area is suppressed.

In the configuration of the fourth embodiment, the address translation apparatus 10 is provided in the bus 36. The address translation apparatus 10 performs the address translation to the plural processors. Accordingly, even if the many processors to which the address translation should be performed exist, it is not necessary to provide the address translation apparatus 10 in each processor. Therefore, the address translation can effectively be performed without enlarging the chip area.

The configuration in which the determination unit 17 is provided in the address translation apparatus 10 of the first embodiment has been described in the fourth embodiment. However, obviously the determination unit 17 may be provided in the configuration of FIG. 3 of the second embodiment. In this case, the processing in Steps S40 to S42 of FIG. 12 may be performed before the processing in Step S20 in the flowchart of FIG. 4.

Figure 13:
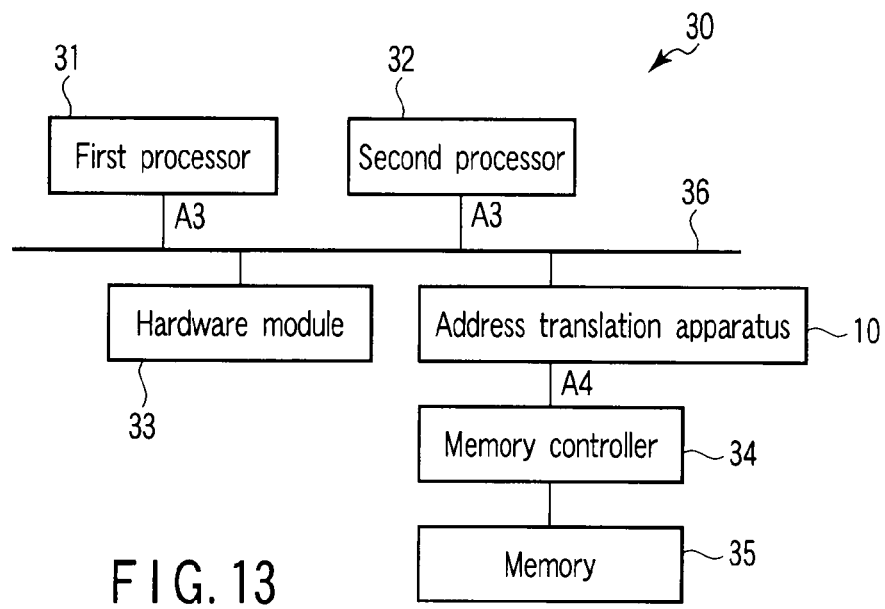
FIG. 13 is a block diagram showing a processor system according to a modification of the fourth embodiment.

In the fourth embodiment, the address translation apparatus 10 is provided in the bus 36. Alternatively, the address translation apparatus 10 may be provided outside the bus 36. The case in which the address translation apparatus 10 is provided outside the bus 36 will be described with reference to FIG. 13. FIG. 13 is a block diagram showing a processor system according to a modification of the fourth embodiment. As shown in FIG. 13, the address translation apparatus 10 is connected to the bus 36, and is provided while correlated to the memory controller 34. The memory controller 34 accesses the memory 35 by receiving the address A4 output from the address translation apparatus 10.

[Fifth Embodiment]

Figure 14:
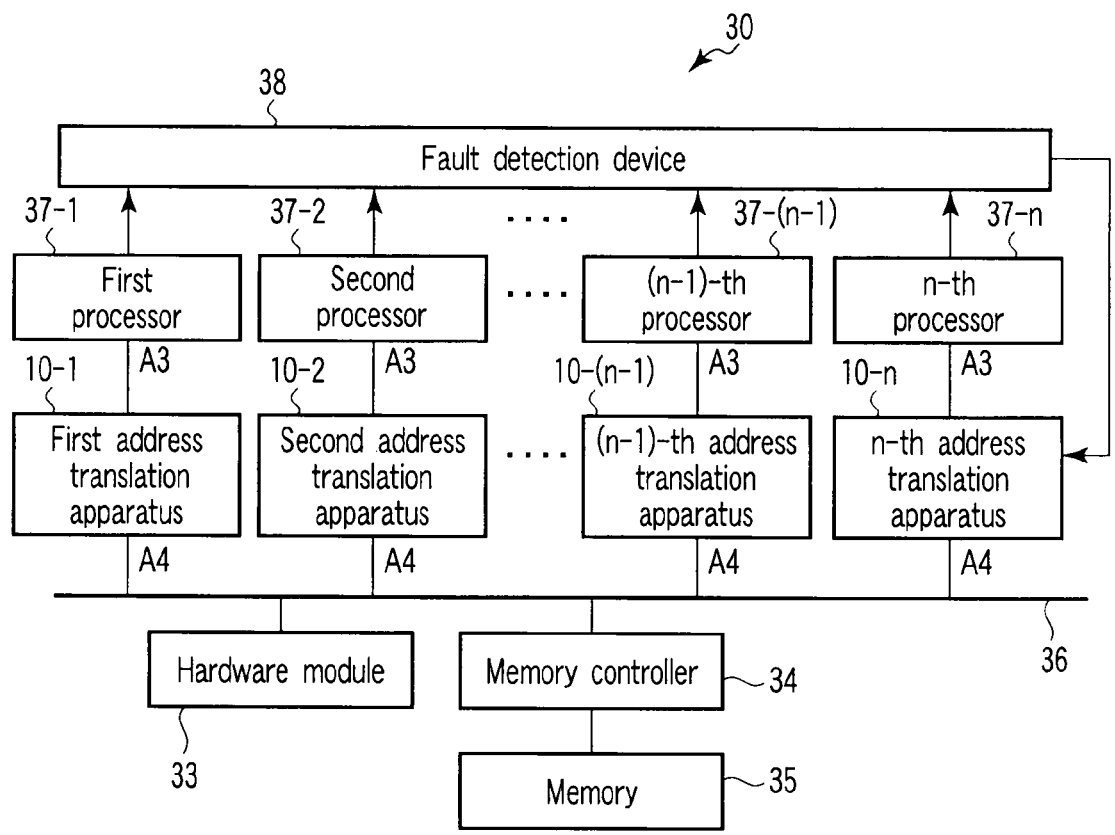
FIG. 14 is a block diagram showing a processor system according to a fifth embodiment of the invention.

A processor system according to a fifth embodiment of the invention will be described. In the fifth embodiment, a fault of the processor is detected, and the translation rule of the address translation apparatus is changed according to the presence or absence of the fault detection. FIG. 14 is a block diagram showing the processor system of the fifth embodiment.

As shown in FIG. 14, the processor system 30 includes n (n is a natural number more than one) first to n-th processors 37-1 to 37-n, first to n-th address translation apparatuses 10-1 to 10-n, the hardware module 33, the memory controller 34, the memory 35, the bus 36, and a fault detection device 38. Hereinafter, sometimes the first to n-th processors 37-1 to 37-n are simply referred to as processor 37 when not distinguished from one another, and the first to n-th address translation apparatuses 10-1 to 10-n are simply referred to as address translation apparatus 10 when not distinguished from one another.

The n processors 37 concurrently perform the processing using software retained in the memory 35. Each of the processors 37 generates the address A3 to access the memory 35. The n-th processor 37-n is an auxiliary processor which is operated instead of the faulty processor when one of the first to (n−1) processors 37-1 to 37-(n−1) breaks down.

The first to n-th address translation apparatuses 10-1 to 10-n are provided while correlated with the first to n-th processors 37-1 to 37-n, respectively. Each of the n address translation apparatuses 10 has the configuration of FIG. 1 of the first embodiment or the configuration of FIG. 3 of the second embodiment, and the address translation apparatus 10 translates the address A3 generated by the corresponding processor 37 into the address A4 and outputs the address A4 to the bus 36.

The configurations of the hardware module 33, memory controller 34, and bus 36 are similar to those of the third embodiment.

The fault detection device 38 monitors each processor 37. When the fault detection device 38 detects the fault in one of the first to (n−1)-th processors 37-1 to 37-(n−1), the fault detection device 38 applies the translation rule (A1, A2, B, and VALID) of the address translation apparatus 10 corresponding to the faulty processor 37 to the n-th address translation apparatus 10-n. For example, a watchdog timer can be used as the fault detection device 38.

Figure 15:
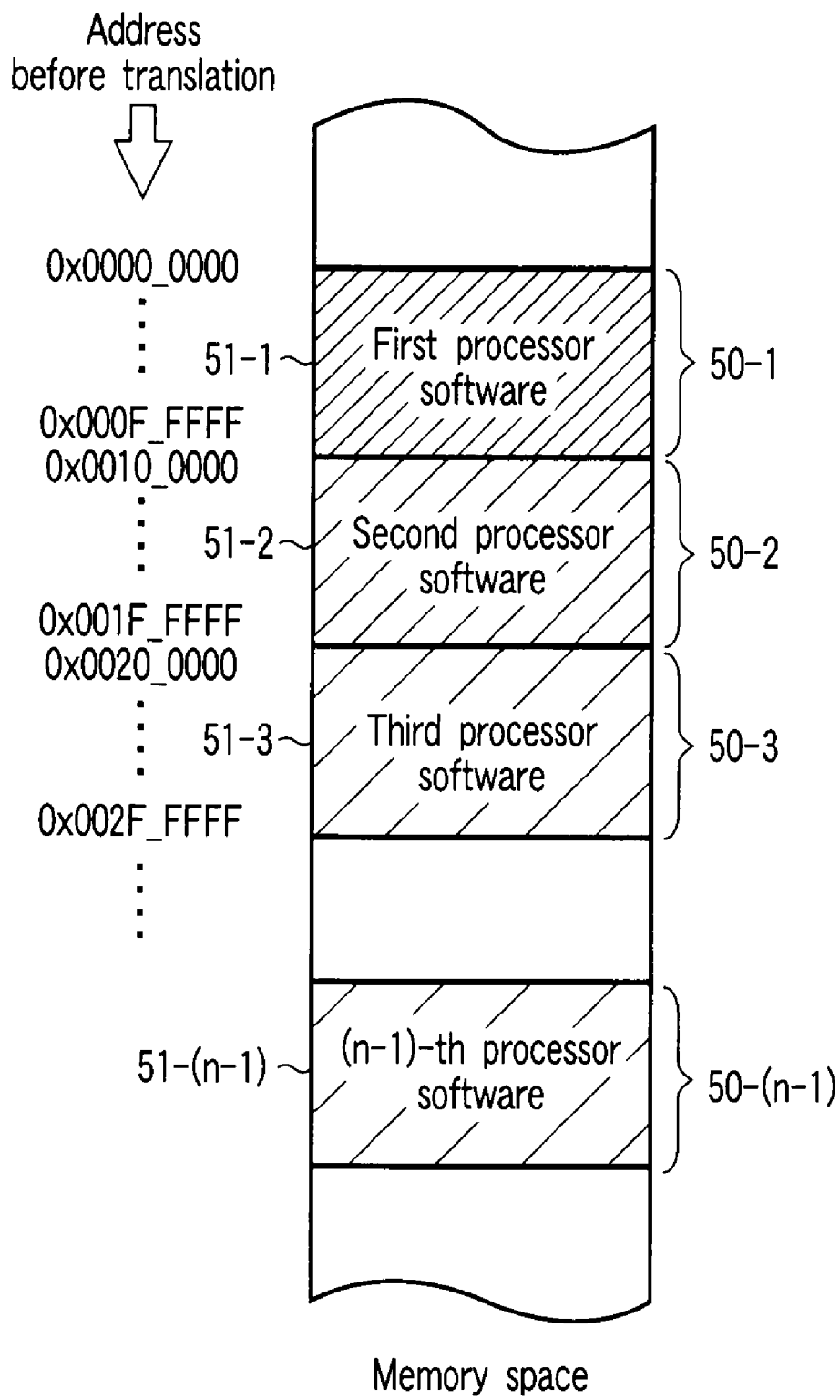
FIG. 15 is a conceptual view showing a memory space in a memory included in the processor system according to the fifth embodiment of the invention.

The memory 35 is formed by a semiconductor memory such as DRAM (SDRAM, DDR-SDRAM, DDR2-SDRAM, and RDRAM [registered trademark]), SRAM and a flash memory or the hard disk. The memory 35 retains software used in each processor 37. FIG. 15 is a conceptual view partially showing the memory space in the memory 35. As shown in FIG. 15, the memory 35 retains software 51-1 to 51-(n−1) in areas 50-1 to 50-(n−1) thereof to operate the first to (n−1)-th processors 37-1 to 37-(n−1).

Accordingly, when the first to (n−1)-th processors 37-1 to 37-(n−1) generate the same address A3 during the boot, the first to (n−1)-th address translation apparatuses 10-1 to 10-(n−1) translate the first address A3 into the addresses A4 corresponding to the areas 50-1 to 50-(n−1) in the memory 35. Therefore, the first to (n−1)-th processors 37-1 to 37-(n−1) perform the processing using the first to (n−1)-th processor software 51-1 to 51-(n−1), respectively.

Figure 16:
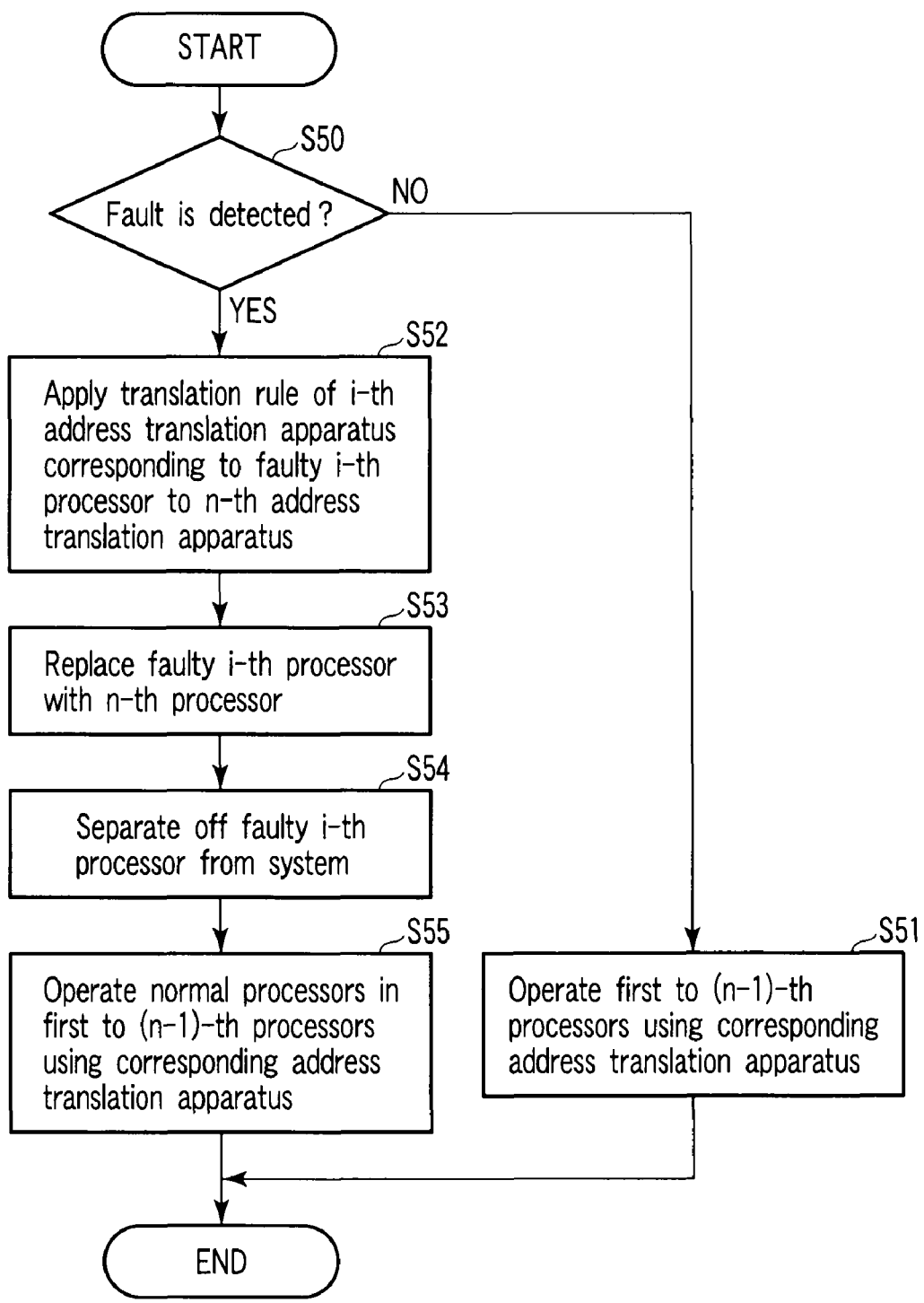
FIG. 16 is a flowchart showing a processing flow of the processor system according to the fifth embodiment of the invention.

An operation of the processor system 30 will be described below with reference to FIG. 16. FIG. 16 is a flowchart showing a flow of the operation performed by the processor system 30 of the fifth embodiment.

The fault detection device 38 detects the presence or absence of the fault. The detection operation may always be performed, or may be performed at predetermined time intervals. As shown in FIG. 16, when the fault detection device 38 does not detect the fault in any processor 37 (NO in Step S50), the first to (n−1)-th processors 37-1 to 37-(n−1) access the memory 35 according to the translation rules of the first to (n−1)-th address translation apparatuses 10-1 to 10-(n−1), respectively (Step S51). That is, the first to (n−1)-th processors 37-1 to 37-(n−1) perform the processing using the first to (n−1)-th software 51-1 to 51-(n−1), respectively. At this point, the n-th processor 37-n does not particularly perform the processing.

When the fault detection device 38 detects the fault in an i-th (i is one of 1 to (n−1)) processor 37-i (YES in Step S50), processing in Step S52 is performed. In Step S52, the fault detection device 38 applies the translation rule of the i-th address translation apparatus 10-i corresponding to the faulty i-th processor 37-i to the auxiliary n-th address translation apparatus 10-n. The n-th processor 37-n starts the operation using the n-th address translation apparatus 10-n. That is, the faulty i-th processor 37-i is replaced with the auxiliary n-th processor 37-n (Step S53). Additionally, the fault detection device 38 separates off the faulty i-th processor 37-i from the system 30 (Step S54). This is because the faulty i-th processor 37-i is prevented from running out of control to adversely influence the system. The normal processor 37 performs the operation using the corresponding address translation apparatus 10 (Step S55).

The specific example of the operation in the case where the fault is detected will briefly be described. It is assumed that the second processor 37-2 breaks down in the first to (n−1)-th processors 37-1 to 37-(n−1). The fault detection device 38 which detects the fault of the second processor 37-2 applies the address translation rule of the second address translation apparatus 10-2 to the n-th address translation apparatus 10-n to start the operation of the n-th processor 37-n. The fault detection device 38 separates off the second processor 37-2 from the system 30. For example, the fault detection device 38 stops the operation of the second processor 37-2. Specifically, the fault detection device 38 stops supply of a clock to the faulty second processor 37-2, stops the electric power supply to the second processor 37-2, or separates off the second processor 37-2 from the bus 36. Therefore, the n-th processor 37-n reads the second processor software 51-2 from the memory 35, and performs the processing according to the second processor software 51-2. The first processor 37-1 and the third to (n−1)-th processors 37-3 to 37-(n−1) perform the processing using the first processor software 51-1 and the third to (n−1)-th processor software 51-3 to 51-(n−1).

In the configuration of the fifth embodiment, the following effect (5) is obtained in addition to the effects (1) to (4) of the first to fourth embodiments. (5) Operational reliability of the processor system can be improved.

In the configuration of the fifth embodiment, the auxiliary processor 37-n and the address translation apparatus 10-n are provided, and the translation rule of the address translation apparatus 10 corresponding to the processor is applied to the auxiliary address translation apparatus 10 when the fault is generated in one of the processors 37. Accordingly, the auxiliary processor 37-n can perform the processing which should be performed by the faulty processor 37. Therefore, even if the fault is generated in one of the processors 37, the processor system 30 can maintain the processing capacity as a whole, and the operational reliability of the processor system 30 can be improved.

In the fifth embodiment, the address translation apparatuses 10 are provided for all the processors 37. However, there may be the processor 37 for which the address translation apparatus 10 is not provided. In such cases, when the processor 37 breaks down, the auxiliary n-th address translation apparatus 10-n does not perform the address translation. The plural address translation apparatuses 10 may have the same translation rule. In such cases, the plural processors 37 perform the processing using the same software 51. This method is effectively used when a large load is particularly applied on the processing of the software 51. Although only one auxiliary processor 37-n is provided in the fifth embodiment, obviously the plural auxiliary processors may be provided.

Figure 17:
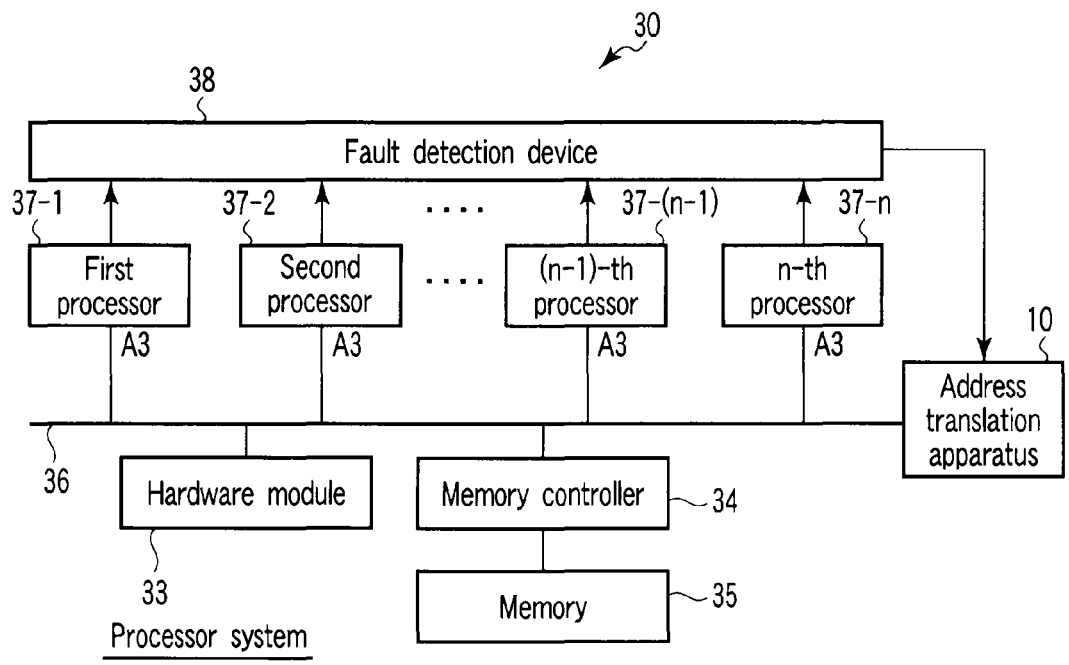
FIGS. 17 and 18 are block diagrams respectively showing processor systems according to first and second modifications of the fifth embodiment.
Figure 18:
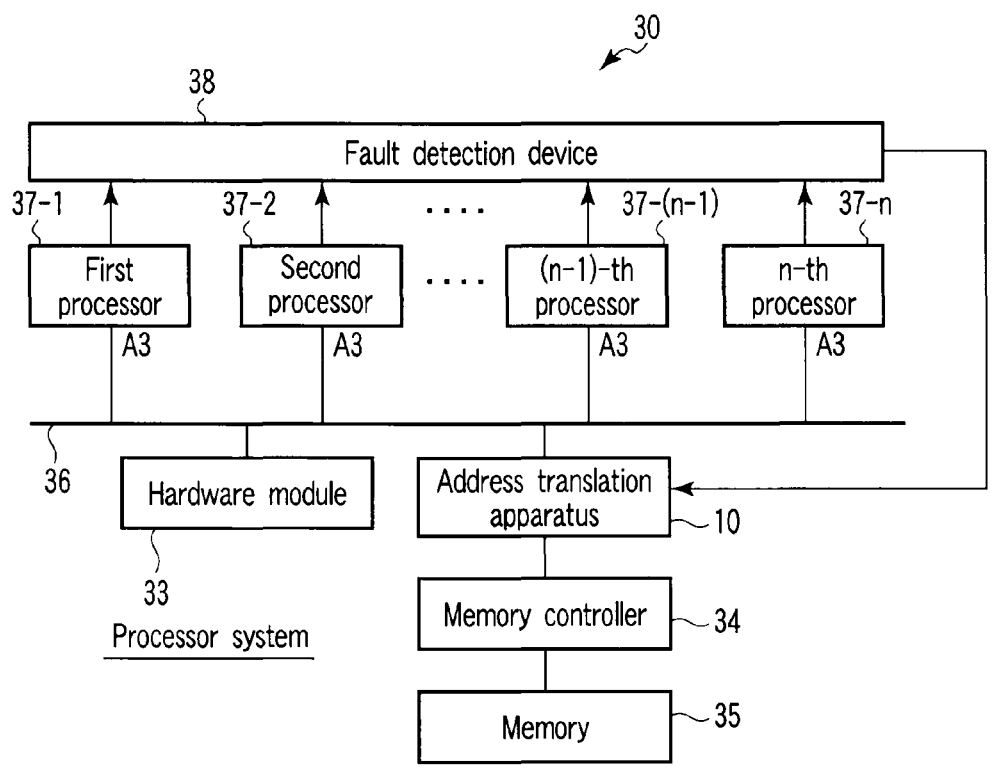

The fifth embodiment can be combined with the fourth embodiment. FIGS. 17 and 18 are block diagrams showing processor systems 30 according to first and second modifications of the fifth embodiment. As shown in FIG. 17, similarly to the configuration of FIG. 10 of the fourth embodiment, the address translation apparatus 10 may be provided in the bus 36. As shown in FIG. 18, similarly to the configuration of FIG. 13 of the fourth embodiment, the address translation apparatus 10 may be provided while correlated with the memory controller 34.

[Sixth Embodiment]

Figure 19:
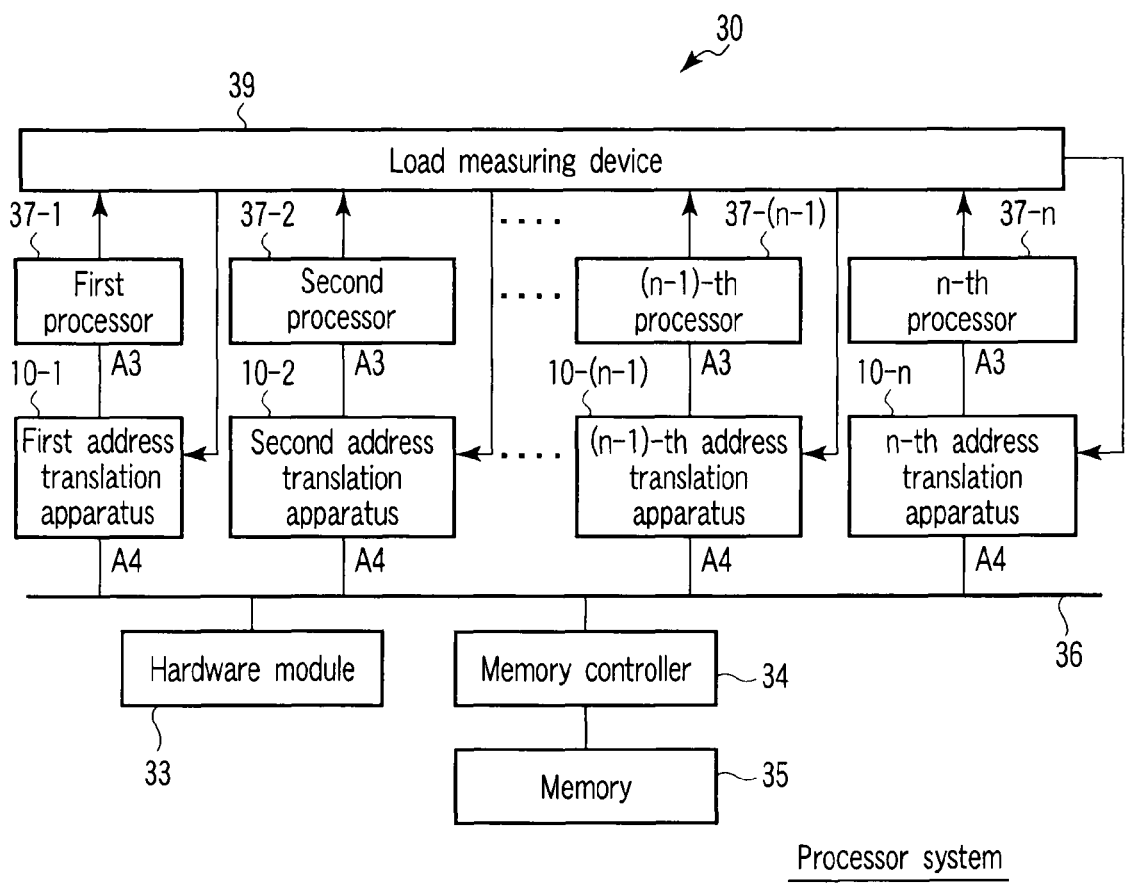
FIG. 19 is a block diagram showing a processor system according to a sixth embodiment of the invention.

A processor system according to a sixth embodiment of the invention will be described. In the sixth embodiment, the load on the processor is measured, and the translation rule of the address translation apparatus is changed according to magnitude of the load. FIG. 19 is a block diagram showing a processor system of the sixth embodiment.

As shown in FIG. 19, in the processor system 30 of the sixth embodiment, the fault detection device 38 in FIG. 14 of the fifth embodiment is removed while a load measuring device 39 is further included. The n-th processor 37-n and the n-th address translation apparatus 10-n are not spare, but the n-th processor 37-n and the n-th address translation apparatus 10-n perform the operations similar to those of other processors 37 and address translation apparatuses 10. Accordingly, the memory 35 further retains n-th processor software 51-n used in the n-th processor 37-n.

The load measuring device 39 measures the loads on the first to n-th processors 37-1 to 37-n. The load is measured by monitoring power consumption of each of the processors 37-1 to 37-n or by monitoring whether or not each of the processors 37-1 to 37-n is in a sleep mode. The translation rule of the address translation apparatus 10 corresponding to the processor 37 having the large load is applied to the address translation apparatus 10 corresponding to the processor 37 having the small load. Because other configurations are similar to those of FIG. 14, the description thereof is omitted.

Figures 20, 21:
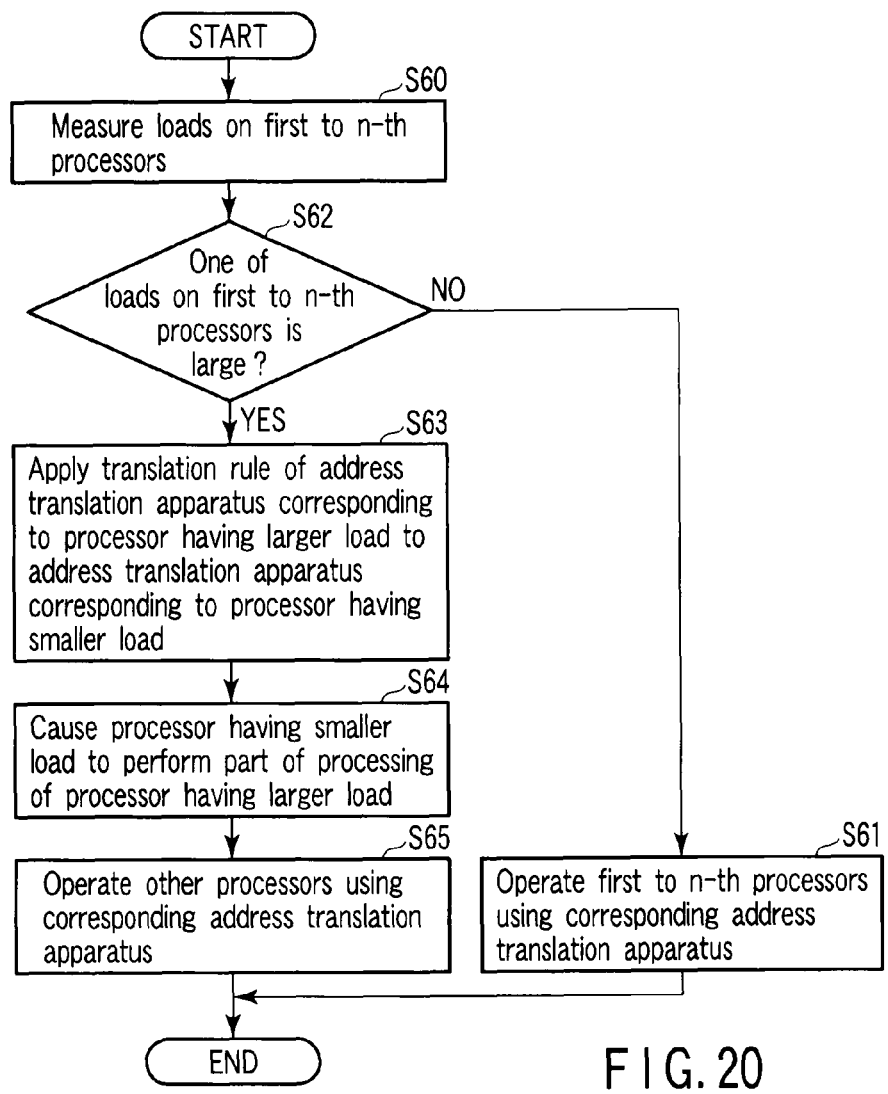
FIG. 20 is a flowchart showing a processing flow of the processor system according to the sixth embodiment of the invention.
FIG. 21 is a conceptual view showing a table included in a load detection device in the processor system according to the sixth embodiment of the invention.

An operation of the processor system 30 will be described below with reference to FIG. 20. FIG. 20 is a flowchart showing a flow of the operation performed by the processor system 30 of the sixth embodiment.

As shown in FIG. 20, the load measuring device 39 measures the loads on the first to n-th processors 37-1 to 37-n (Step S60). The load may always be measured, or the load may be measured at predetermined time intervals.

When all the processors 37 have the small loads (NO in Step S62), the first to n-th processors 37-1 to 37-n access the memory 35 according to the translation rules of the first to n-th address translation apparatuses 10-1 to 10-n, respectively (Step S61). That is, the first to n-th processors 37-1 to 37-n perform the processing using the first to n-th software 51-1 to 51-n, respectively. The magnitude of the load can be determined based on a threshold previously retained in the load measuring device 39.

As a result of the load measurement, when one of the processors 37 has the large load (YES in Step S62), the load measuring device 39 performs processing in Step S63. That is, the translation rule of the address translation apparatus 10 corresponding to the processor having the large load is applied to the address translation apparatus 10 corresponding to the processor having the small load. The load measuring device 39 causes other processors 37 having the small loads to perform part of the processing of the processor 37 having the large load (Step S64). Other processors 37 are operated using the corresponding address translation apparatus 10 (Step S65).

The specific example of the processing will be described with reference to FIG. 21. FIG. 21 is a conceptual view showing a table included in the load measuring device 39. The load measuring device 39 retains two thresholds Lth(low) and Lth(high) in addition to the table of FIG. 21. The threshold Lth(low) is the minimum value of the load which should be processed by the processor 37 and the threshold Lth(high) is the maximum value of the load which should be processed by the processor 37. The table retains a relationship between load amounts L1 to Ln and the thresholds Lth(low) and Lth (high) thereof in each of the first to n-th processors.

For example, the load L1 of the first processor 37-1 is Lth(Low)<L1<Lth(high) and the load L3 of the third processor 37-3 is Lth(Low)<L3<Lth(high). Accordingly, the processing of the first and third processors 37-1 and 37-3 are not allocated to other processors 37 and are not replaced with the pieces of processing of other processors 37.

On the other hand, the load L2 of the second processor 37-2 is Lth(high)<L2. That is, it is determined that the second processor 37-2 has the large load. The load Ln of the n-th processor 37-n is Ln<Lth(low). That is, it is determined that the n-th processor 37-n has the small load.

Accordingly, the load measuring device 39 equalizes the translation rule of the n-th address translation apparatus 10-n with the translation rule of the second address translation apparatus 10-2. Therefore, the processing based on the second processor software 51-2 is performed not only by the second processor 37-2 but also by the n-th processor 37-n.

The above-described technique is described only by way of example, and various techniques can be adopted to determine the magnitude of the load.

In the configuration of the sixth embodiment, the following effect (6) is also obtained in addition to the effects (1) to (5) of the first to fifth embodiments.

(6) Processing efficiency of the processor system can be improved (part 1).

In the configuration of the sixth embodiment, the load measuring device 39 measures the load on each processor 37. The address translation apparatus 10 corresponding to the processor 37 having the small load is set to the translation rule similar to that of the address translation apparatus 10 corresponding to the processor 37 having the large load. That is, part of the processing of the processor 37 having the large load is performed by the processor 37 having the small load. Accordingly, the loads are dispersed among the processors 37, and the processing efficiency of the processor system can be improved.

In the sixth embodiment, one of the address translation apparatuses 10 may perform the constant address translation irrespective of the load on the corresponding processor 37, or may perform no address translation all the time.

Figure 22:
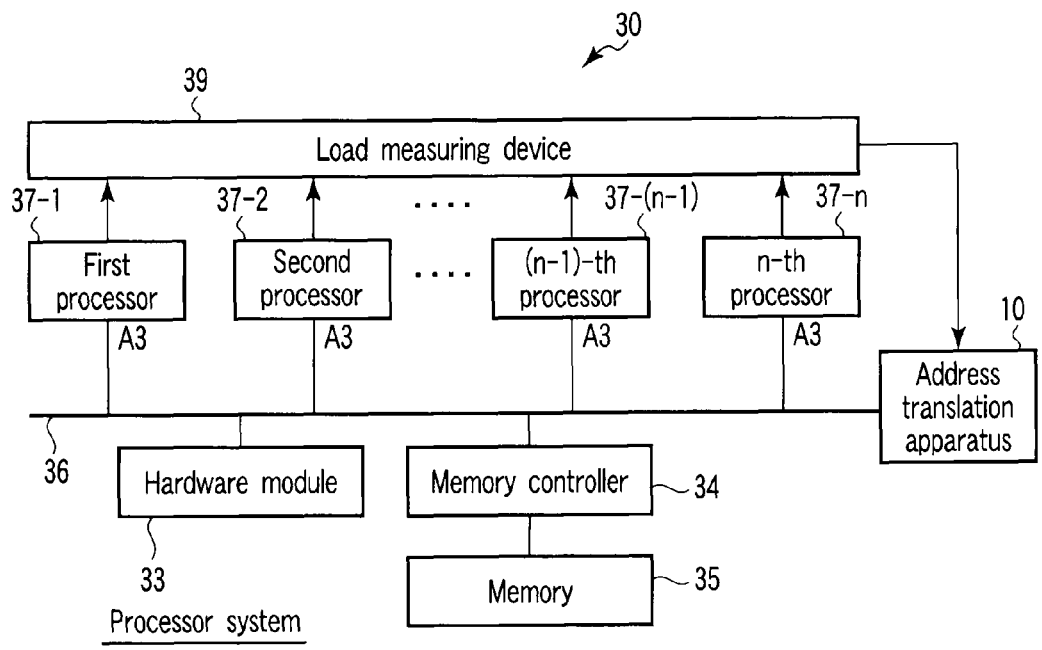
FIGS. 22 and 23 are block diagrams respectively showing processor systems according to first and second modifications of the sixth embodiment.
Figure 23:
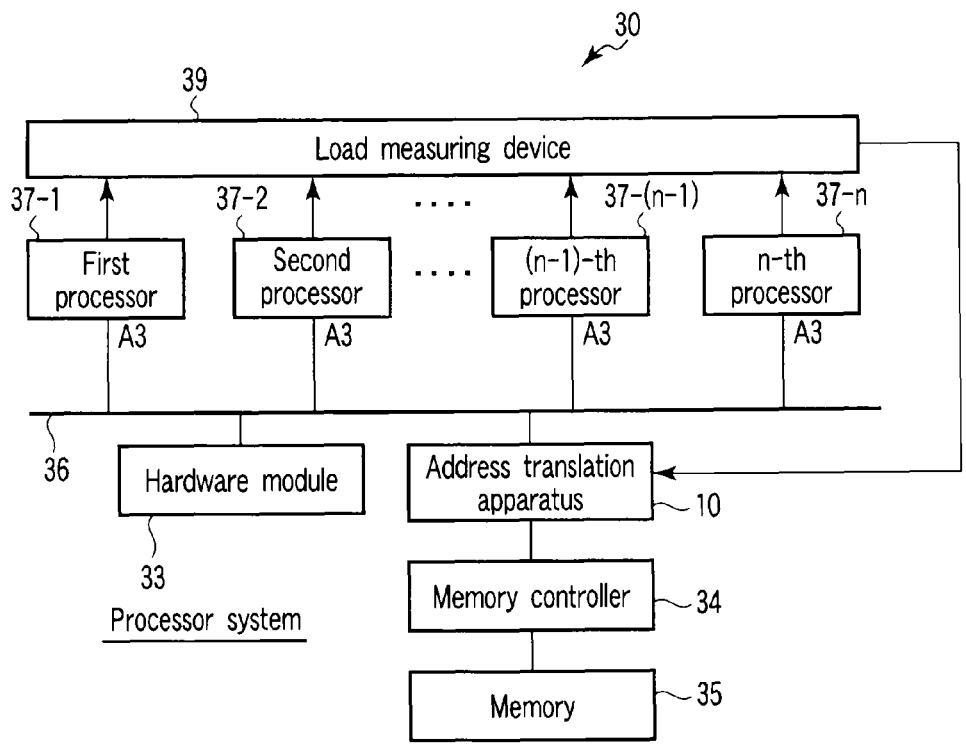

The sixth embodiment can be combined with the fourth embodiment. FIGS. 22 and 23 are block diagrams showing processor systems 30 according to first and second modifications of the sixth embodiment. As shown in FIG. 22, similarly to the configuration of FIG. 10 of the fourth embodiment, the address translation apparatus 10 may be provided in the bus 36. As shown in FIG. 23, similarly to the configuration of FIG. 13 of the fourth embodiment, the address translation apparatus 10 may be provided while correlated with the memory controller 34.

The sixth embodiment can also be combined with the fifth embodiment. That is, in the configuration of FIG. 19, the fault detection device 38, the auxiliary processor 37, and the address translation apparatus 10 may further be provided to adopt the method of the fifth embodiment. In such cases, the effect (5) of the fifth embodiment is also obtained.

[Seventh Embodiment]

A processor system according to a seventh embodiment of the invention will be described below. In the seventh embodiment, the loads are dispersed by a method different from the sixth embodiment.

A configuration of the processor system of the seventh embodiment is similar to those of FIGS. 19, 22, and 23 of the sixth embodiment, so that the description thereof is omitted. However, the seventh embodiment differs from the sixth embodiment in that the processors 37 have the different processing capacities.

FIG. 24 is a flowchart showing a flow of the operation performed by the processor system 30 of the seventh embodiment.

As shown in FIG. 24, the load measuring device 39 measures the loads on the first to n-th processors 37-1 to 37-n (Step S70). The load may always be measured, or may be measured at predetermined time intervals.

As a result of the load measurement, when the high-processing capacity processor 37 has the small load while the low-processing capacity processor 37 has the large load (YES in Step S71), the load measuring device 39 performs processing in Step S73. That is, the translation rule of the address translation apparatus 10 corresponding to the processor having the large load is applied to the address translation apparatus 10 corresponding to the processor having the small load (Step S73). The load measuring device 39 applies the translation rule of the address translation apparatus 10 corresponding to the processor having the small load to the address translation apparatus 10 corresponding to the processor having the large load (Step S74).

That is, the load measuring device 39 replaces the processing of the processor having the high processing capacity with the processing of the processor having the low processing capacity (Step S75). Other processors 37 are operated using the corresponding address translation apparatus 10 (Step S76).

When the condition in Step S71 is not satisfied (NO in Step S71), the first to n-th processors 37-1 to 37-n access the memory 35 according to the translation rules of the first to n-th address translation apparatuses 10-1 to 10-n, respectively (Step S72).

For example, it is assumed that the relationship between the load on each processor 37 and the threshold is shown in FIG. 21 and the processing capacity of the second processor 37-2 is lower than that of the n-th processor 37-n. In such cases, the processing of the second processor 37-2 is replaced with the processing of the n-th processor 37-n. The determination of the magnitude of the load may be made based on whether or not a ratio of the loads or a difference in load between the two processors 37 exceeds a predetermined threshold.

In the configuration of the seventh embodiment, the following effect (7) is also obtained in addition to the effects (1) to (4) of the first to fourth embodiments.

(7) The processing efficiency of the processor system can be improved (part 2).

In the configuration of the seventh embodiment, the load measuring device 39 measures the load on each processor 37. The processing of the high-processing capacity processor 37 having the small load is replaced with the processing of the low-processing capacity processor 37 having the large load, so that the processing allocated to each processor 37 can be optimized according to the capacity of each processor 37. Accordingly, the loads are dispersed among the processors 37, and the processing efficiency of the processor system can be improved.

In the seventh embodiment, one of the address translation apparatuses 10 may perform the constant address translation irrespective of the load on the corresponding processor 37, or may perform no address translation all the time.

The seventh embodiment can be combined with the fifth embodiment, and the method of the sixth embodiment can be adopted at the same time. In this case, the effect (5) of the fifth embodiment and the effect (6) of the sixth embodiment can be obtained at the same time. Although the processors have the different processing capacities in the seventh embodiment, the processing may be exchanged among the processors having the same processing capacity.

Thus, the address can be translated more simply in the address translation apparatus and processor system according to the first to seventh embodiments. Accordingly, even in the multiprocessor system, the single processor software can be used as the software used in each processor.

Figure 25:
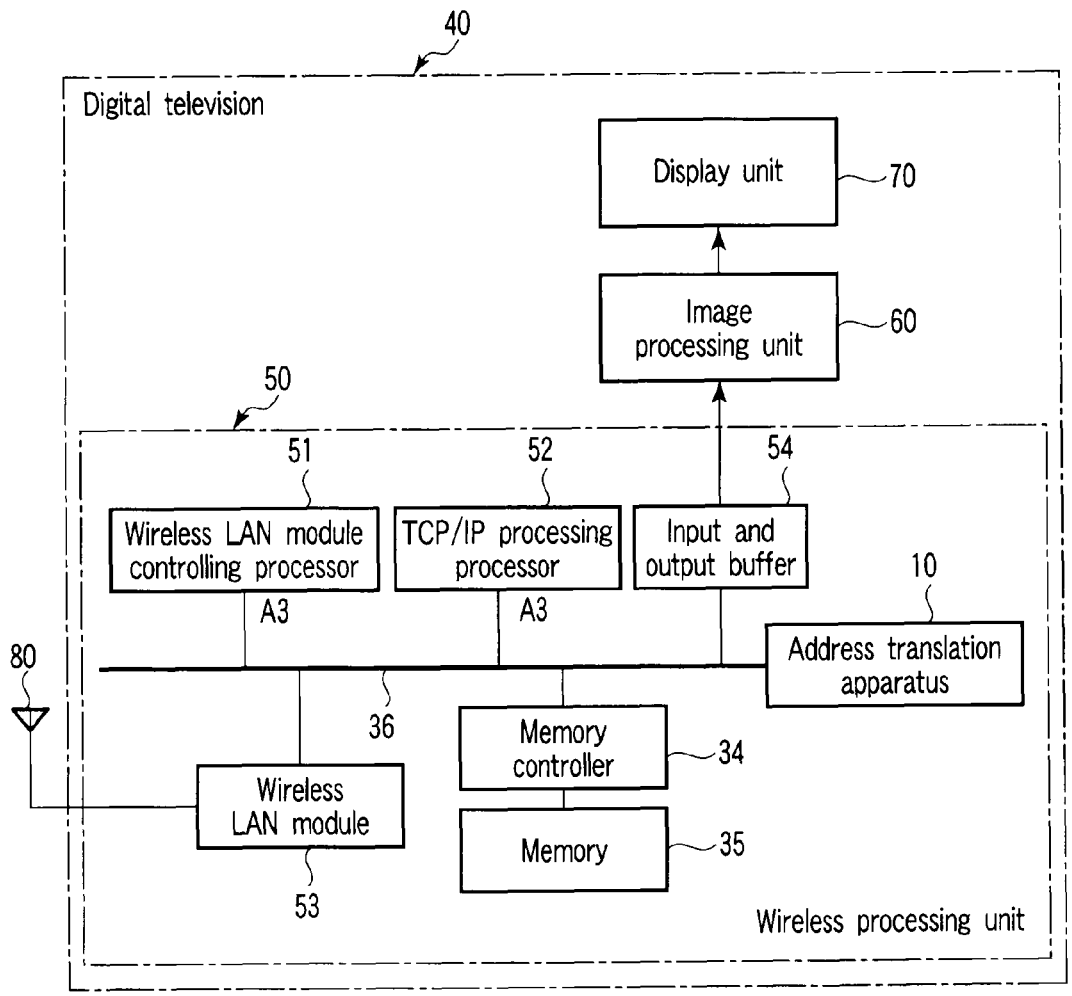
FIG. 25 is a block diagram showing a digital television including the address translation apparatus and processor system according to the first to seventh embodiments.

For example, the processor system of the embodiments can be applied to a digital television. FIG. 25 is a block diagram showing an internal configuration of a digital television. As shown in FIG. 25, a digital television 40 includes a wireless processing unit 50, an image processing unit 60, a display unit 70, and an antenna 80.

The antenna 80 receives a video data frame which is encoded in the form of, e.g., MPEG2 (Moving Picture Experts Group-2 Transport Stream) by wireless communication. The wireless processing unit 50 processes the frame received through the antenna 80, and outputs the frame to the image processing unit 60. The image processing unit 60 includes MPEG CODEC to decode video data. The display unit 70 displays the video data decoded by the image processing unit 60.

The wireless processing unit 50 includes a wireless local area network (LAN) module controlling processor 51, a TCP/IP processor 52, a wireless LAN module 53, an input and output buffer 54, the address translation apparatus 10, the memory controller 34, the memory 35, and the bus 36.

The wireless LAN module 53 controls the whole of receiving processing of the video data received through the antenna 80. For example, the wireless LAN module 53 removes an MAC header from the frame received through the antenna 80. The processor 51 controls the operation of the wireless LAN module 53. The processor 52 performs TCP/IP processing to a packet processed by the wireless LAN module 53, and converts the frame into the form (packet) which is processable in the image processing unit 60. The input and output buffer 54 outputs the video data converted into the packet to the image processing unit 60.

The input and output buffer 54 receives the packet from the image processing unit 60. The processor 52 performs the TCP/IP processing to the packet received by the input and output buffer 54. Then, the processing is performed in the wireless LAN module 53, and the video data assembled into the frame is transmitted through the antenna 80.

The memory 35 retains wireless LAN module controlling software used by the processor 51 and TCP/IP processing software used by the processor 52.

In the above-described configuration, the address translation apparatus 10 translates one or both of the addresses A3 output from the processors 51 and 52, the processor 51 is caused to access the wireless LAN module controlling software, and the processor 52 is caused to access the TCP/IP processing software.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor system comprising:
    a memory device configured to retain data;
    a plurality of processors which generate addresses when accessing the memory device, the memory device retaining a program executed by the processors;
    a data bus which connects the memory device and the processors;
    an address translation apparatus which is provided in the data bus or connected to the data bus, and translates the address generated by the processor; and
    a fault measuring device which detects a fault of the processor, the address translation apparatus translating the address generated by the processor according to the fault detected by the measuring device.

2. The system according to claim 1, wherein the address translation apparatus replaces the faulty processor with a normal processor, which is a non-faulty one of the processors, by translating an address generated by the normal processor into an address corresponding to an area retaining the program which is executed by the faulty processor in the memory device, when the fault measuring device detects the fault of one of the processors.

3. The system according to claim 2, wherein the fault measuring device stops operation of the faulty processor.

4. The system according to claim 2, wherein one of the processors is used as an alternative dedicated to the faulty processor.

5. The system according to claim 1, wherein the address translation apparatus includes a plurality of translation units which are provided in the processors, respectively, and
    each of the translation units translates the address generated by the corresponding processor.

6. A processor system comprising:
    a memory device configured to retain data;
    a plurality of processors which generate addresses when accessing the memory device, the memory device retaining a program executed by the processors;
    a data bus which connects the memory device and the processors;
    an address translation apparatus which is provided in the data bus or connected to the data bus, and translates the address generated by the processor; and
    a load measuring device which measures a load on the processor, the address translation apparatus translating the address generated by the processor according to the load measured by the load measuring device.

7. The system according to claim 6, wherein the load measuring device measures whether or not the load is higher than a first threshold in each processor, and measures whether or not the load is lower than a second threshold in each processor, the second threshold being lower than the first threshold, and
    the processor having the high load is replaced with the processor having the low load by translating an address generated by the processor whose load is lower than the second threshold into an address corresponding to an area retaining the program which is executed by the processor whose load is higher than the first threshold in the memory device.

8. The system according to claim 7, wherein the load measuring device measures power consumption of the processor.

9. The system according to claim 6, wherein the address translation apparatus includes a plurality of translation units which are provided in the processors, respectively, and
    each of the translation units translates the address generated by the corresponding processor.

* * * * *